US012733056B2

(12) United States Patent
Kim et al.

(10) Patent No.: US 12,733,056 B2
(45) Date of Patent: Sep. 8, 2026

(54) METHOD FOR TRANSMITTING MESSAGE INCLUDING TERMINAL INFORMATION IN WIRELESS COMMUNICATION SYSTEM, AND APPARATUS THEREFOR

(71) Applicant: LG Electronics Inc., Seoul (KR)

(72) Inventors: Heejin Kim, Seoul (KR); Hanbyul Seo, Seoul (KR)

(73) Assignee: LG Electronics Inc., Seoul (KR)

(*) Notice: Subject to any disclaimer, the term of this patent is extended or adjusted under 35 U.S.C. 154(b) by 329 days.

(21) Appl. No.: 18/563,189

(22) PCT Filed: May 13, 2022

(86) PCT No.: PCT/KR2022/006861
§ 371 (c)(1),
(2) Date: Nov. 21, 2023

(87) PCT Pub. No.: WO2022/245052
PCT Pub. Date: Nov. 24, 2022

(65) Prior Publication Data

US 2024/0237114 A1 Jul. 11, 2024

(30) Foreign Application Priority Data

May 21, 2021 (KR) ........................ 10-2021-0065187

(51) Int. Cl.
*H04W 76/18* (2018.01)
*H04L 5/00* (2006.01)
(Continued)

(52) U.S. Cl.
CPC ........... *H04W 76/18* (2018.02); *H04L 5/0048* (2013.01); *H04W 28/0226* (2013.01); *H04W 64/003* (2013.01)

(58) Field of Classification Search
CPC .. H04L 5/0048; H04W 28/0226; H04W 4/12; H04W 4/40; H04W 64/003; H04W 76/18; H04W 92/18
See application file for complete search history.

(56) References Cited

U.S. PATENT DOCUMENTS

2018/0158019 A1* 6/2018 Vutukuri ................ H04W 4/35
2021/0067912 A1* 3/2021 Leem .................... H04W 4/023
(Continued)

FOREIGN PATENT DOCUMENTS

WO 2020/226315 A1 11/2020
WO 2020/242156 A1 12/2020

OTHER PUBLICATIONS

ETSI, “Intelligent Transport Systems (ITS); Vulnerable Road Users (VRU) awareness; Part 3: Specification of VRU awareness basic service; Release 2,” ETSI TS 103 300-3 V2.1.2, Apr. 2021, 109 pages.
(Continued)

*Primary Examiner* — Awet Haile
(74) *Attorney, Agent, or Firm* — Fish & Richardson P.C.

(57) ABSTRACT

Disclosed, according to various embodiments, are a method and an apparatus for transmitting, by a terminal, a message including terminal information in a wireless communication system. The method and the apparatus therefor are disclosed, the method comprising the steps of: receiving configuration information related to transmission of the message; transmitting a first message including the terminal information at a first point of time on the basis of the configuration information; and transmitting a second message including the terminal information at a second point of time on the basis of the configuration information, wherein on the basis of omission of transmission of a third message at a third point of time between the first point of time and the
(Continued)

second point of time, the second message further includes a data field including a path history.

4 Claims, 16 Drawing Sheets

(51) Int. Cl.
*H04W 28/02* (2009.01)
*H04W 64/00* (2009.01)

(56) References Cited

U.S. PATENT DOCUMENTS

2021/0209937 A1* 7/2021 Eilertsen ............... H04W 4/023
2022/0046391 A1* 2/2022 Ong ........................ H04W 4/08
2022/0272679 A1* 8/2022 Wang .................... H04W 72/20
2023/0319765 A1* 10/2023 Manolakos ........... H04W 64/00
455/456.1

OTHER PUBLICATIONS

Partial Supplementary European Search Report in European Appln. No. 22804907.8, mailed on May 7, 2025, 14 pages.

* cited by examiner

FIG. 6
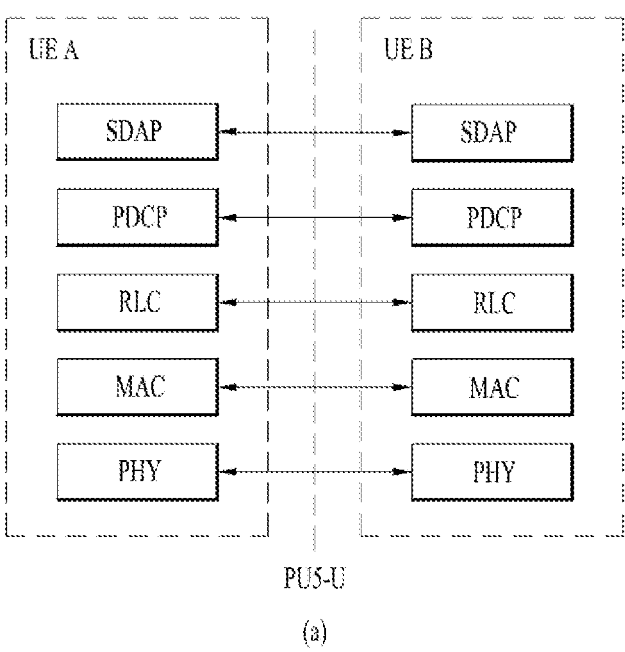
(a)
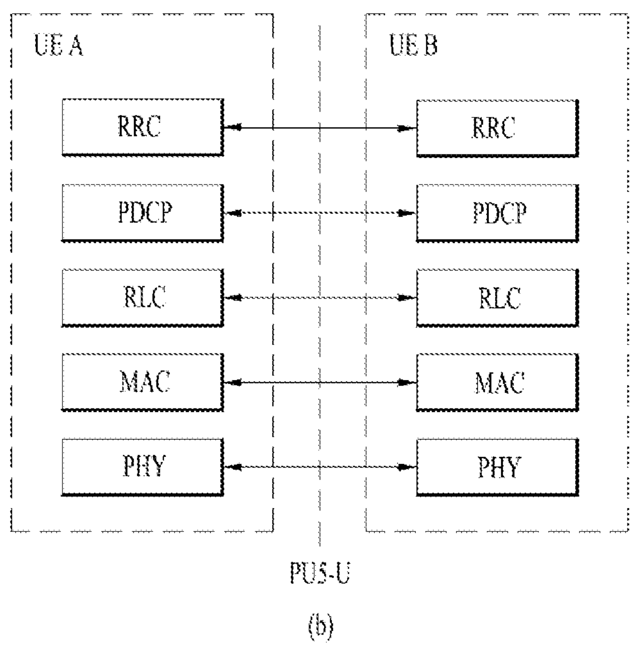
(b)

FIG. 7
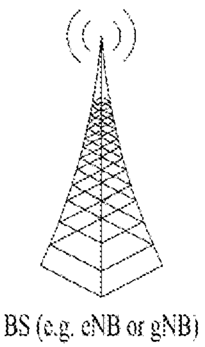
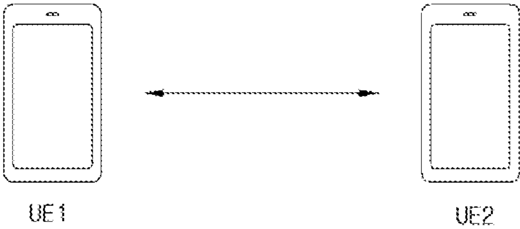

FIG. 9
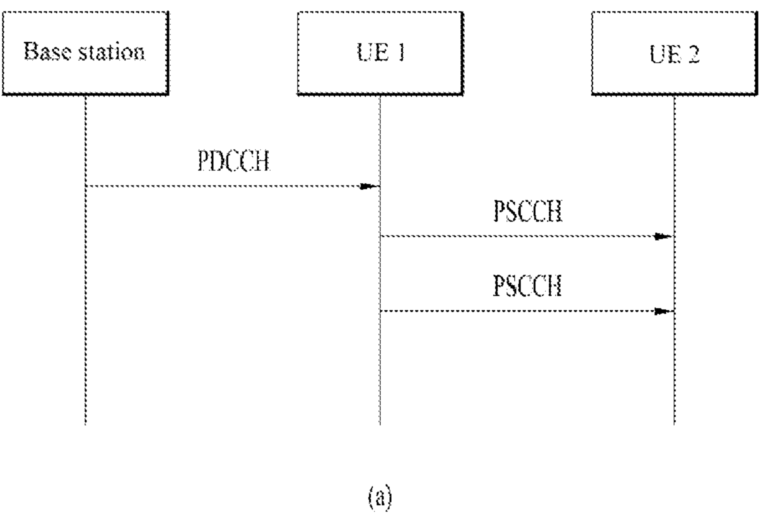
(a)
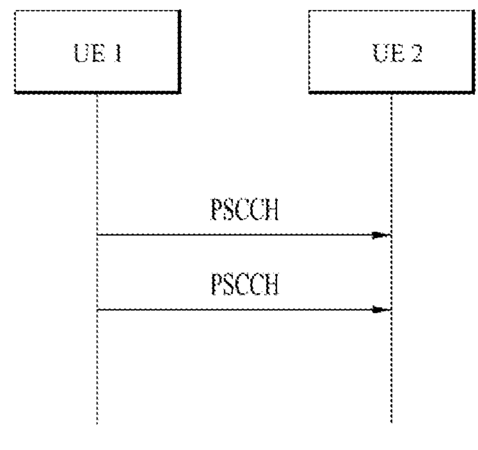
(b)

FIG. 10

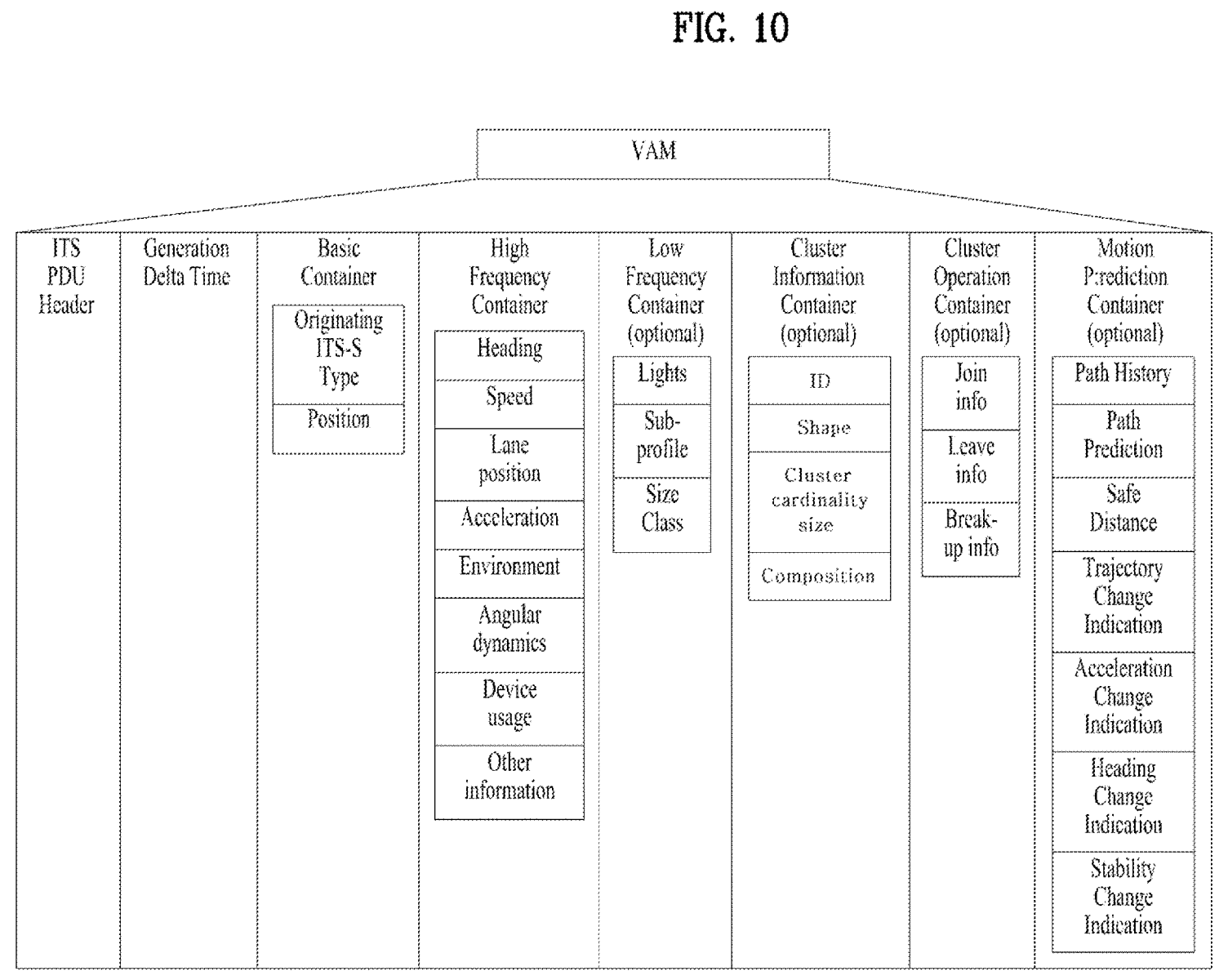

VAM

ITS PDU Header

Generation Delta Time

Basic Container
Originating ITS-S Type
Position

High Frequency Container
Heading
Speed
Lane position
Acceleration
Environment
Angular dynamics
Device usage
Other information Low Frequency Container (optional)
Lights
Sub-profile
Size Class Cluster Information Container (optional)
ID
Shape
Cluster cardinality size
Composition Cluster Operation Container (optional)
Join info
Leave info
Break-up info Motion Prediction Container (optional)
Path History
Path Prediction
Safe Distance
Trajectory Change Indication
Acceleration Change Indication
Heading Change Indication
Stability Change Indication FIG. 11
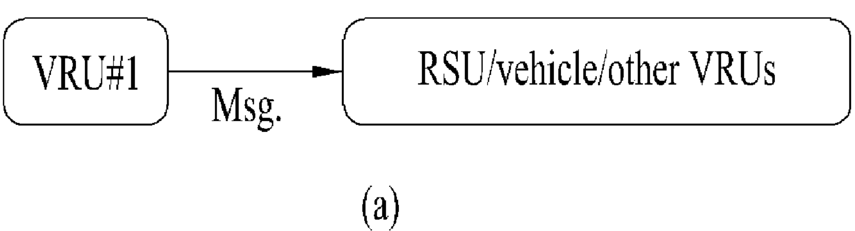
(a)
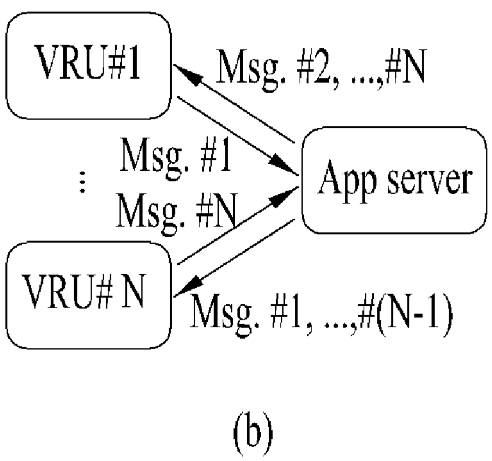
(b)
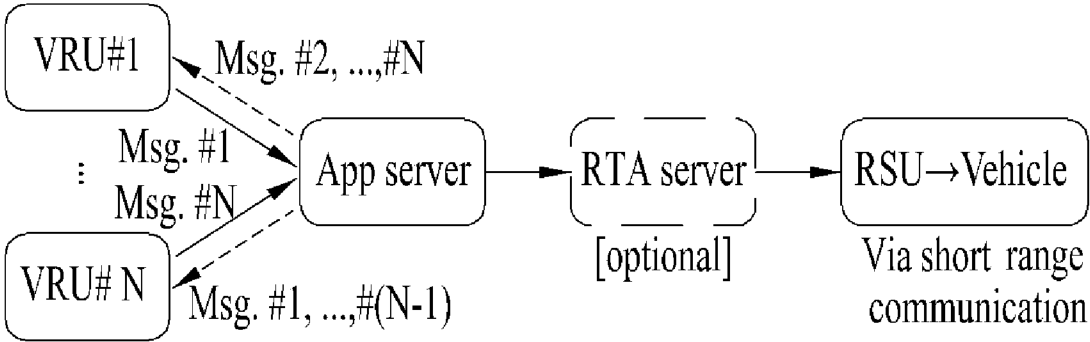
(c)

METHOD FOR TRANSMITTING MESSAGE INCLUDING TERMINAL INFORMATION IN WIRELESS COMMUNICATION SYSTEM, AND APPARATUS THEREFOR

CROSS-REFERENCE TO RELATED APPLICATIONS

This application is a National Stage application under 35 U.S.C. § 371 of International Application No. PCT/KR2022/006861, filed on May 13, 2022, which claims the benefit of Korean Application No. 10-2021-0065187, filed on May 21, 2021. The disclosures of the prior applications are incorporated by reference in their entirety.

TECHNICAL FIELD

The present disclosure relates to a method of transmitting a message including user equipment (UE) information by a UE in a wireless communication system and apparatus therefor.

BACKGROUND

Wireless communication systems have been widely deployed to provide various types of communication services such as voice or data. In general, a wireless communication system is a multiple access system that supports communication of multiple users by sharing available system resources (a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

A sidelink (SL) refers to a communication method in which a direct link is established between user equipment (UE), and voice or data is directly exchanged between terminals without going through a base station (BS). SL is being considered as one way to solve the burden of the base station due to the rapidly increasing data traffic.

V2X (vehicle-to-everything) refers to a communication technology that exchanges information with other vehicles, pedestrians, and infrastructure-built objects through wired/wireless communication. V2X may be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive Machine Type Communication (MTC), and Ultra-Reliable and Low Latency Communication (URLLC) may be referred to as new radio access technology (RAT) or new radio (NR). Even in NR, vehicle-to-everything (V2X) communication may be supported.

FIG. 1 is a diagram comparing RAT-based V2X communication before NR with NR-based V2X communication.

Regarding V2X communication, in RAT prior to NR, a scheme for providing a safety service based on V2X messages such as a basic safety message (BSM), a cooperative awareness message (CAM), and a decentralized environmental notification message (DENM) was mainly discussed. The V2X message may include location information, dynamic information, and attribute information. For example, the UE may transmit a periodic message type CAM and/or an event triggered message type DENM to another UE.

For example, the CAM may include dynamic state information about a vehicle such as direction and speed, vehicle static data such as dimensions, and basic vehicle information such as external lighting conditions and route details. For example, a UE may broadcast the CAM, and the CAM latency may be less than 100 ms. For example, when an unexpected situation such as a breakdown of the vehicle or an accident occurs, the UE may generate a DENM and transmit the same to another UE. For example, all vehicles within the transmission coverage of the UE may receive the CAM and/or DENM. In this case, the DENM may have a higher priority than the CAM.

Regarding V2X communication, various V2X scenarios have been subsequently introduced in NR. For example, the various V2X scenarios may include vehicle platooning, advanced driving, extended sensors, and remote driving.

For example, based on vehicle platooning, vehicles may dynamically form a group and move together. For example, to perform platoon operations based on vehicle platooning, vehicles belonging to the group may receive periodic data from a leading vehicle. For example, the vehicles belonging to the group may reduce or increase the distance between the vehicles based on the periodic data.

For example, based on advanced driving, a vehicle may be semi-automated or fully automated. For example, each vehicle may adjust trajectories or maneuvers based on data acquired from local sensors of nearby vehicles and/or nearby logical entities. Also, for example, each vehicle may share driving intention with nearby vehicles.

For example, on the basis of extended sensors, raw data or processed data acquired through local sensors, or live video data may be exchanged between a vehicle, a logical entity, UEs of pedestrians and/or a V2X application server. Thus, for example, the vehicle may recognize an environment that is improved over an environment that may be detected using its own sensor.

For example, for a person who cannot drive or a remote vehicle located in a dangerous environment, a remote driver or V2X application may operate or control the remote vehicle based on remote driving. For example, when a route is predictable as in the case of public transportation, cloud computing-based driving may be used to operate or control the remote vehicle. For example, access to a cloud-based back-end service platform may be considered for remote driving.

A method to specify service requirements for various V2X scenarios such as vehicle platooning, advanced driving, extended sensors, and remote driving is being discussed in the NR-based V2X communication field.

DISCLOSURE

Technical Problem

The present disclosure aims to provide a method and apparatus for skipping some transmissions in event-based periodic message transmission not only to significantly reduce the amount and frequency of data in communication between a vulnerable road user (VRU) and a soft vehicle-to-everything (SoftV2X) server but also reduce the operational costs of the SoftV2X server and minimize power consumption for the VRU.

It will be appreciated by those of ordinary skill in the art to which the embodiment(s) pertain that the objects that could be achieved with the embodiment(s) are not limited to what has been particularly described hereinabove and the above and other objects will be more clearly understood from the following detailed description.

Technical Solution

In an aspect of the present disclosure, provided herein is a method of transmitting a message including user equipment (UE) information by a UE in a wireless communication system. The method may include: receiving configuration information related to transmission of the message; transmitting a first message including the UE information at a first point in time based on the configuration information; and transmitting a second message including the UE information at a second point in time based on the configuration information. The second message may additionally include a data field including a path history based on that transmission of a third message is skipped at a third point in time between the first point in time and the second point in time.

Alternatively, feedback information may include a measurement report on a reference signal or hybrid automatic repeat request (HARQ) feedback on data.

Alternatively, the transmission of the third message may be skipped at the third point in time when a first time interval between the first point in time and the second point in time is greater than or equal to a first threshold interval.

Alternatively, the first threshold interval may be determined based on a transmission cycle included in the configuration information.

Alternatively, the second message may additionally include the data field when a number of times that transmission is skipped within a first time interval between the first point in time and the second point in time is greater than or equal to a threshold count or when the first time interval is greater than or equal to a second time interval.

Alternatively, a size or type of the data field may be determined based on the number of times that the transmission is skipped or a length of the first time interval.

Alternatively, the second message may additionally include the data field when a number of times that the UE transitions from a second state to a first state within a first time interval between the first point in time and the second point in time is greater than or equal to a threshold transition count.

Alternatively, a size or type of the data field may be determined based on the number of times that the UE transitions from the second state to the first state.

Alternatively, the second message may be transmitted when preconfigured trigger conditions included in the configuration information are satisfied. The preconfigured trigger conditions may include at least one of: when a change in mobility of the UE exceeds a specific threshold; when a distance from the UE to a surrounding device is smaller than a specific threshold distance; or when the UE joins a cluster.

Alternatively, the transmission of the third message may be skipped based on that the trigger conditions are not satisfied from the first point in time to the third point in time.

Alternatively, the method may further include, based on that the transmission of the third message is skipped, transmitting skipping information including at least one of: the third point in time; the first point in time; the second point in time; a number of times that transmission is skipped within the first time interval; or a number of times that the UE transitions from a second state to a first state within the first time interval.

Alternatively, the skipping information may be transmitted along with the second message at the second point in time.

In another aspect of the present disclosure, provided herein is a method of receiving, by a server, a UE message including UE information from a UE in a wireless communication system. The method may include: receiving a first UE message including the UE information at a first point in time; generating the UE message directly and transmitting the UE message to surrounding devices based on that the UE message is not received until a third point in time, wherein the third point in time is after a first threshold interval from the first point in time; and receiving a second UE message at a second point in time, wherein the second UE message additionally includes a data field including a path history.

In another aspect of the present disclosure, provided herein is a UE configured to transmit a message including UE information in a wireless communication system. The UE may include: a radio frequency (RF) transceiver; and a processor connected to the RF transceiver. The processor may be configured to control the RF transceiver to: receive configuration information related to transmission of the message; transmit a first message including the UE information at a first point in time based on the configuration information; and transmit a second message including the UE information at a second point in time based on the configuration information. The second message may additionally include a data field including a path history based on that transmission of a third message is skipped at a third point in time between the first point in time and the second point in time.

In another aspect of the present disclosure, provided herein is a server configured to receive a message including UE information in a wireless communication system. The server may include: an RF transceiver; and a processor connected to the RF transceiver. The processor may be configured to: control the RF transceiver to receive a first message including the UE information at a first point in time; generate a message directly and control the RF transceiver to transmit the message to surrounding devices based on that the message is not received until a third point in time, wherein the third point in time is after a first threshold interval from the first point in time; and control the RF transceiver to receive a second message at a second point in time, wherein the second message additionally includes a data field including a path history.

In another aspect of the present disclosure, provided herein is a chipset configured to transmit a message including UE information in a wireless communication system. The chipset may include: at least one processor; and at least one memory operably connected to the at least one processor and configured to, when executed, cause the at least one processor to perform operations. The operations may include: receiving configuration information related to transmission of the message; transmitting a first message including the UE information at a first point in time based on the configuration information; and transmitting a second message including the UE information at a second point in time based on the configuration information. The second message may additionally include a data field including a path history based on that transmission of a third message is skipped at a third point in time between the first point in time and the second point in time.

In a further aspect of the present disclosure, provided herein is a computer-readable storage medium having at least one computer program configured to cause at least one processor to perform operations to transmit a message including UE information in a wireless communication system. The at least one computer program may be stored on the computer-readable storage medium. The operations may include: receiving configuration information related to transmission of the message; transmitting a first message including the UE information at a first point in time based on the configuration information; and transmitting a second message including the UE information at a second point in time based on the configuration information. The second message may additionally include a data field including a path history based on that transmission of a third message is skipped at a third point in time between the first point in time and the second point in time.

Advantageous Effects

According to various embodiments, some transmissions may be skipped in event-based periodic message transmission, thereby significantly reducing the amount and frequency of data in communication between a user equipment (UE) and a soft vehicle-to-everything (SoftV2X) server.

The signaling loads and power consumption of the UE may be minimized by significantly reducing the amount and frequency of data in communication between the UE and the SoftV2X server.

The operational costs of the SoftV2X server may be cut down by significantly reducing the amount and frequency of data in communication between the UE and the SoftV2X server, Furthermore, when the UE skips transmission of a message on the UE, the SoftV2X server may transmit the message to neighboring UEs on behalf of the UE, thereby ensuring the periodicity of the message transmission for the neighboring UEs.

Effects to be achieved by embodiment(s) are not limited to what has been particularly described hereinabove and other effects not mentioned herein will be more clearly understood by persons skilled in the art to which embodiment(s) pertain from the following detailed description.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure.

FIG. 6 illustrates a radio protocol architecture for SL communication.

FIG. 7 illustrates UEs performing V2X or SL communication.

FIG. 9 illustrates a procedure in which UEs perform V2X or SL communication according to a transmission mode.

FIG. 10 is a diagram for explaining a vulnerable road user (VRU) awareness message (VAM) defined in an ITS/SAE (intelligent transport system/the Society of Automotive Engineers) scenario.

FIG. 11 is a diagram for explaining system structures for transmitting and receiving messages between a UE, a server, and surrounding vehicles.

DETAILED DESCRIPTION

Figure 1:
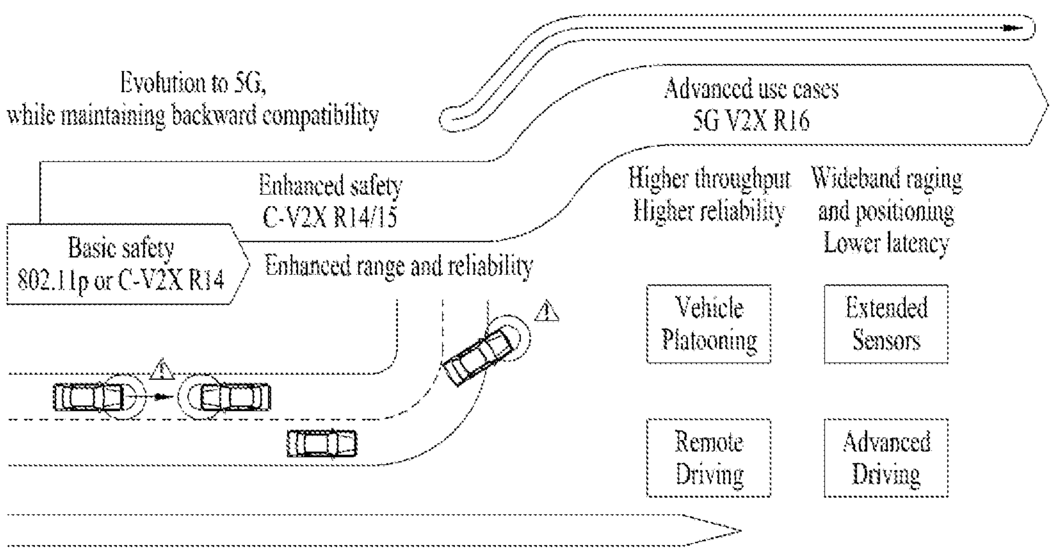
FIG. 1 is a diagram for explaining by comparing V2X communication based on RAT before NR and V2X communication based on NR.

The wireless communication system is a multiple access system that supports communication with multiple users by sharing available system resources (e.g., bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency (SC-FDMA) system, a multi carrier frequency division multiple access (MC-FDMA) system, and the like.

A sidelink refers to a communication scheme in which a direct link is established between user equipments (UEs) to directly exchange voice or data between UEs without assistance from a base station (BS). The sidelink is being considered as one way to address the burden on the BS caused by rapidly increasing data traffic.

Vehicle-to-everything (V2X) refers to a communication technology for exchanging information with other vehicles, pedestrians, and infrastructure-built objects through wired/wireless communication. V2X may be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive MTC, and Ultra-Reliable and Low Latency Communication (URLLC) may be referred to as new radio access technology (RAT) or new radio (NR). Even in NR, V2X communication may be supported.

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. 3GPP NR (New Radio or New Radio Access Technology) is an evolved version of 3GPP LTE/LTE-A/LTE-A pro.

5G NR is a successor technology of LTE-A, and is a new clean-slate mobile communication system with characteristics such as high performance, low latency, and high availability. 5G NR may utilize all available spectrum resources, from low frequency bands below 1 GHz to intermediate frequency bands from 1 GHz to 10 GHz and high frequency (millimeter wave) bands above 24 GHz.

For clarity of explanation, LTE-A or 5G NR is mainly described, but the technical spirit of the embodiment(s) is not limited thereto.

Figure 2:
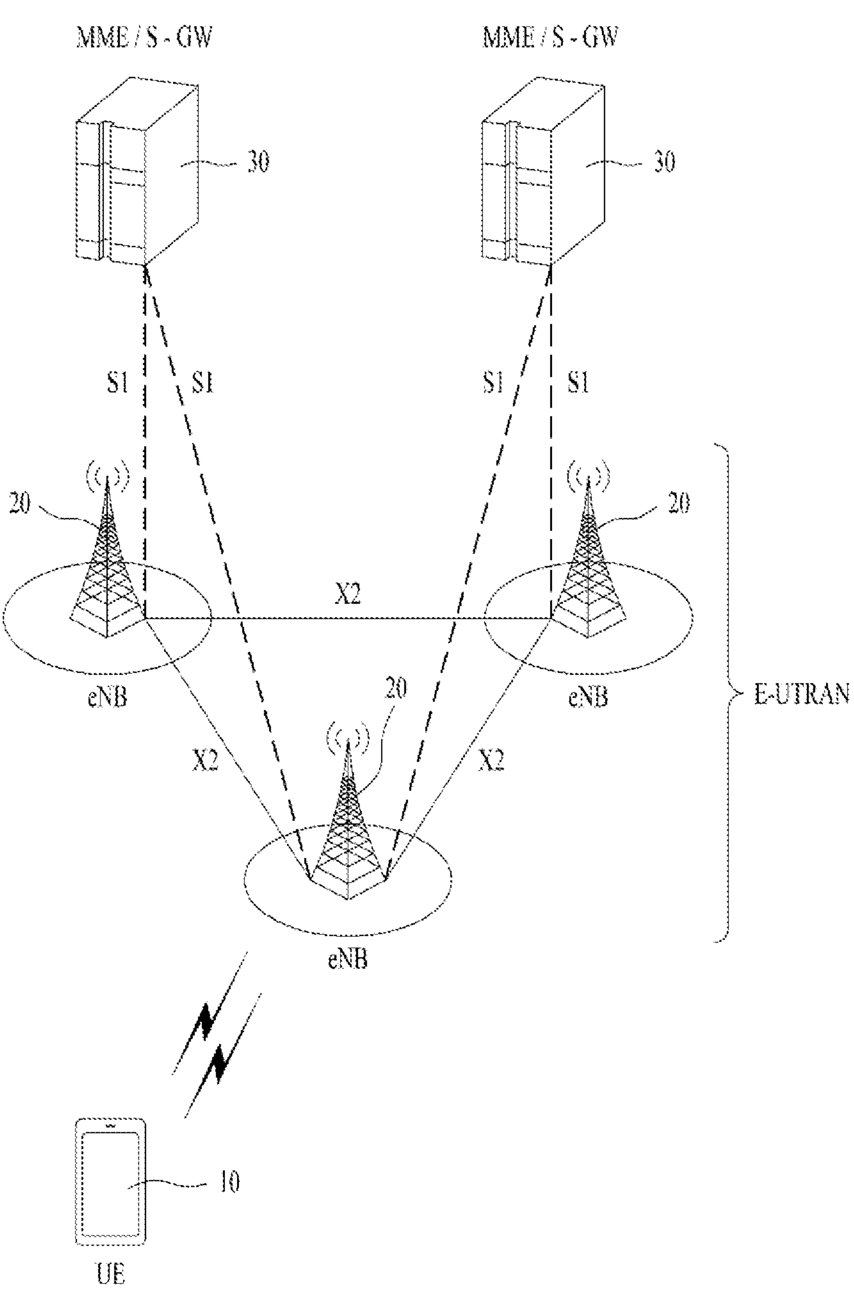
FIG. 2 illustrates the structure of an LTE system to which embodiment(s) are applicable.

FIG. 2 illustrates the structure of an LTE system to which the present disclosure is applicable. This may also be called an evolved UMTS terrestrial radio access network (E-UTRAN) or LTE/LTE-A system.

Referring to FIG. 2, the E-UTRAN includes evolved Node Bs (eNBs) 20 which provide a control plane and a user plane to UEs 10. A UE 10 may be fixed or mobile, and may also be referred to as a mobile station (MS), user terminal (UT), subscriber station (SS), mobile terminal (MT), or wireless device. An eNB 20 is a fixed station communication with the UE 10 and may also be referred to as a base station (BS), a base transceiver system (BTS), or an access point.

eNBs 20 may be connected to each other via an X2 interface. An eNB 20 is connected to an evolved packet core (EPC) 39 via an S1 interface. More specifically, the eNB 20 is connected to a mobility management entity (MME) via an S1-MME interface and to a serving gateway (S-GW) via an S1-U interface.

The EPC 30 includes an MME, an S-GW, and a packet data network-gateway (P-GW). The MME has access information or capability information about UEs, which are mainly used for mobility management of the UEs. The S-GW is a gateway having the E-UTRAN as an end point, and the P-GW is a gateway having a packet data network (PDN) as an end point.

Based on the lowest three layers of the open system interconnection (OSI) reference model known in communication systems, the radio protocol stack between a UE and a network may be divided into Layer 1 (L1), Layer 2 (L2) and Layer 3 (L3). These layers are defined in pairs between a UE and an Evolved UTRAN (E-UTRAN), for data transmission via the Uu interface. The physical (PHY) layer at L1 provides an information transfer service on physical channels. The radio resource control (RRC) layer at L3 functions to control radio resources between the UE and the network. For this purpose, the RRC layer exchanges RRC messages between the UE and an eNB.

Figure 3:
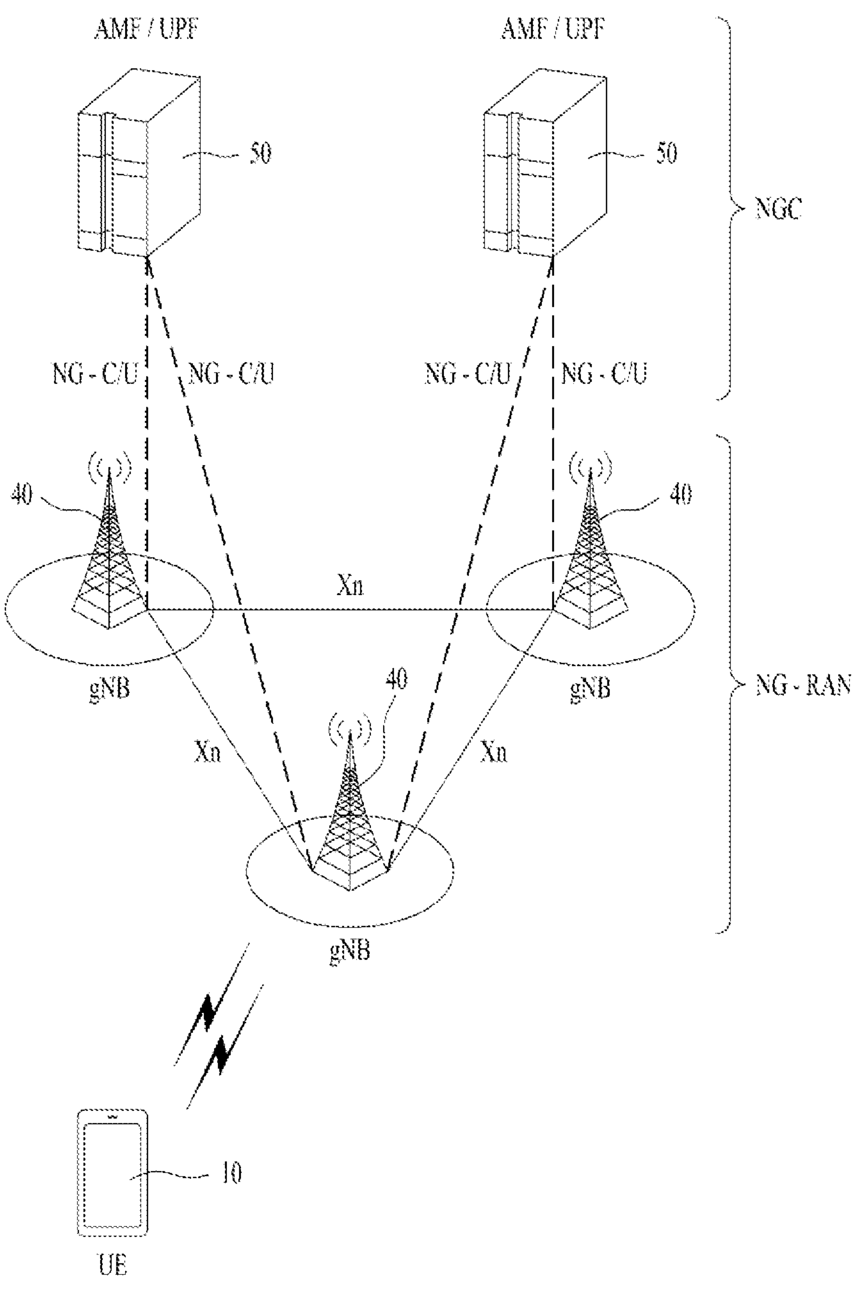
FIG. 3 illustrates the structure of an NR system to which embodiment(s) are applicable.

FIG. 3 illustrates the structure of a NR system to which the present disclosure is applicable.

Referring to FIG. 3, a next generation radio access network (NG-RAN) may include a next generation Node B (gNB) and/or an eNB, which provides user-plane and control-plane protocol termination to a UE. In FIG. 3, the NG-RAN is shown as including only gNBs, by way of example. A gNB and an eNB are connected to each other via an Xn interface. The gNB and the eNB are connected to a 5G core network (5GC) via an NG interface. More specifically, the gNB and the eNB are connected to an access and mobility management function (AMF) via an NG-C interface and to a user plane function (UPF) via an NG-U interface.

Figure 4:
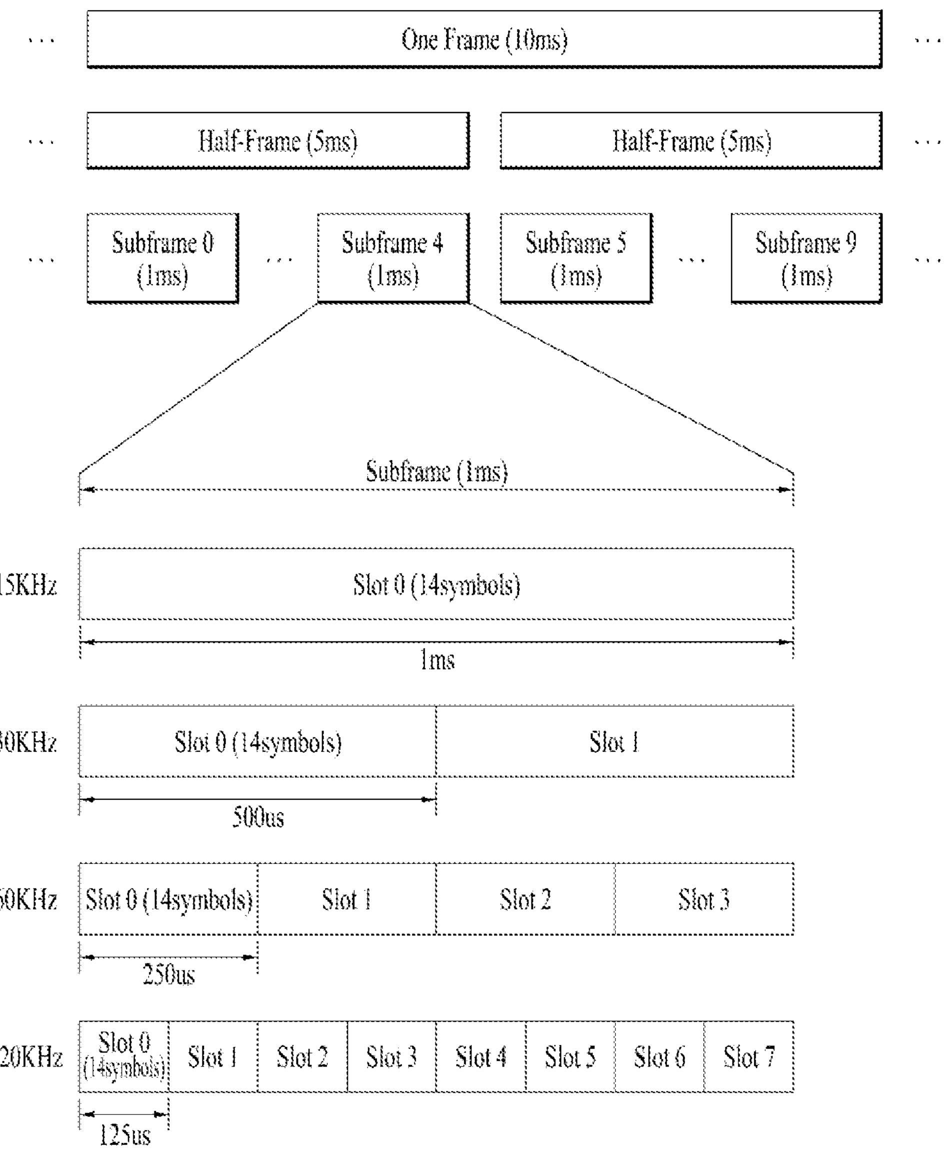
FIG. 4 illustrates the structure of an NR radio frame to which embodiment(s) are applicable.

FIG. 4 illustrates the structure of a NR radio frame to which the present disclosure is applicable.

Referring to FIG. 4, a radio frame may be used for UL transmission and DL transmission in NR. A radio frame is 10 ms in length, and may be defined by two 5-ms half-frames. An HF may include five 1-ms subframes. A subframe may be divided into one or more slots, and the number of slots in an SF may be determined according to a subcarrier spacing (SCS). Each slot may include 12 or 14 OFDM(A) symbols according to a cyclic prefix (CP).

In a normal CP (NCP) case, each slot may include 14 symbols, whereas in an extended CP (ECP) case, each slot may include 12 symbols. Herein, a symbol may be an OFDM symbol (or CP-OFDM symbol) or an SC-FDMA symbol (or DFT-s-OFDM symbol).

Table 1 below lists the number of symbols per slot $N^{slot}_{symb}$, the number of slots per frame $N^{frame,u}_{slot}$, and the number of slots per subframe $N^{subframe,u}_{slot}$ slot according to an SCS configuration μ in the NCP case.

TABLE 1

| SCS (15 * 2u) | $N^{slot}_{symb}$ | $N^{frame,u}_{slot}$ | $N^{subframe,u}_{slot}$ |
|---|---|---|---|
| 15 kHz (u = 0) | 14 | 10 | 1 |
| 30 kHz (u = 1) | 14 | 20 | 2 |
| 60 kHz (u = 2) | 14 | 40 | 4 |
| 120 kHz (u = 3) | 14 | 80 | 8 |
| 240 kHz (u = 4) | 14 | 160 | 16 |

Table 2 below lists the number of symbols per slot, the number of slots per frame, and the number of slots per subframe according to an SCS in the ECP case.

TABLE 2

| SCS (15 * 2^u) | $N^{slot}_{symb}$ | $N^{frame,u}_{slot}$ | $N^{subframe,u}_{slot}$ |
|---|---|---|---|
| 60 kHz (u = 2) | 12 | 40 | 4 |

In the NR system, different OFDM(A) numerologies (e.g., SCSs, CP lengths, etc.) may be configured for a plurality of cells aggregated for one UE. Thus, the (absolute) duration of a time resource (e.g., SF, slot, or TTI) including the same number of symbols may differ between the aggregated cells (such a time resource is commonly referred to as a time unit (TU) for convenience of description).

In NR, multiple numerologies or SCSs to support various 5G services may be supported. For example, a wide area in conventional cellular bands may be supported when the SCS is 15 kHz, and a dense urban environment, lower latency, and a wider carrier bandwidth may be supported when the SCS is 30 kHz/60 kHz. When the SCS is 60 kHz or higher, a bandwidth wider than 24.25 GHz may be supported to overcome phase noise.

The NR frequency band may be defined as two types of frequency ranges. The two types of frequency ranges may be FR1 and FR2. The numerical values of the frequency ranges may be changed. For example, the two types of frequency ranges may be configured as shown in Table 3 below. Among the frequency ranges used in the NR system, FR1 may represent "sub 6 GHz range" and FR2 may represent "above 6 GHz range" and may be called millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical values of the frequency ranges of the NR system may be changed. For example, FR1 may include a band of 410 MHz to 7125 MHz as shown in Table 4 below. That is, FR1 may include a frequency band of 6 GHz (or 5850 MHz, 5900 MHZ, 5925 MHz, etc.) or higher. For example, the frequency band of 6 GHz (or 5850 MHz, 5900 MHZ, 5925 MHZ, etc.) or higher included in FR1 may include an unlicensed band. The unlicensed band may be used for various purposes, for example, for communication for vehicles (e.g., autonomous driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 5:
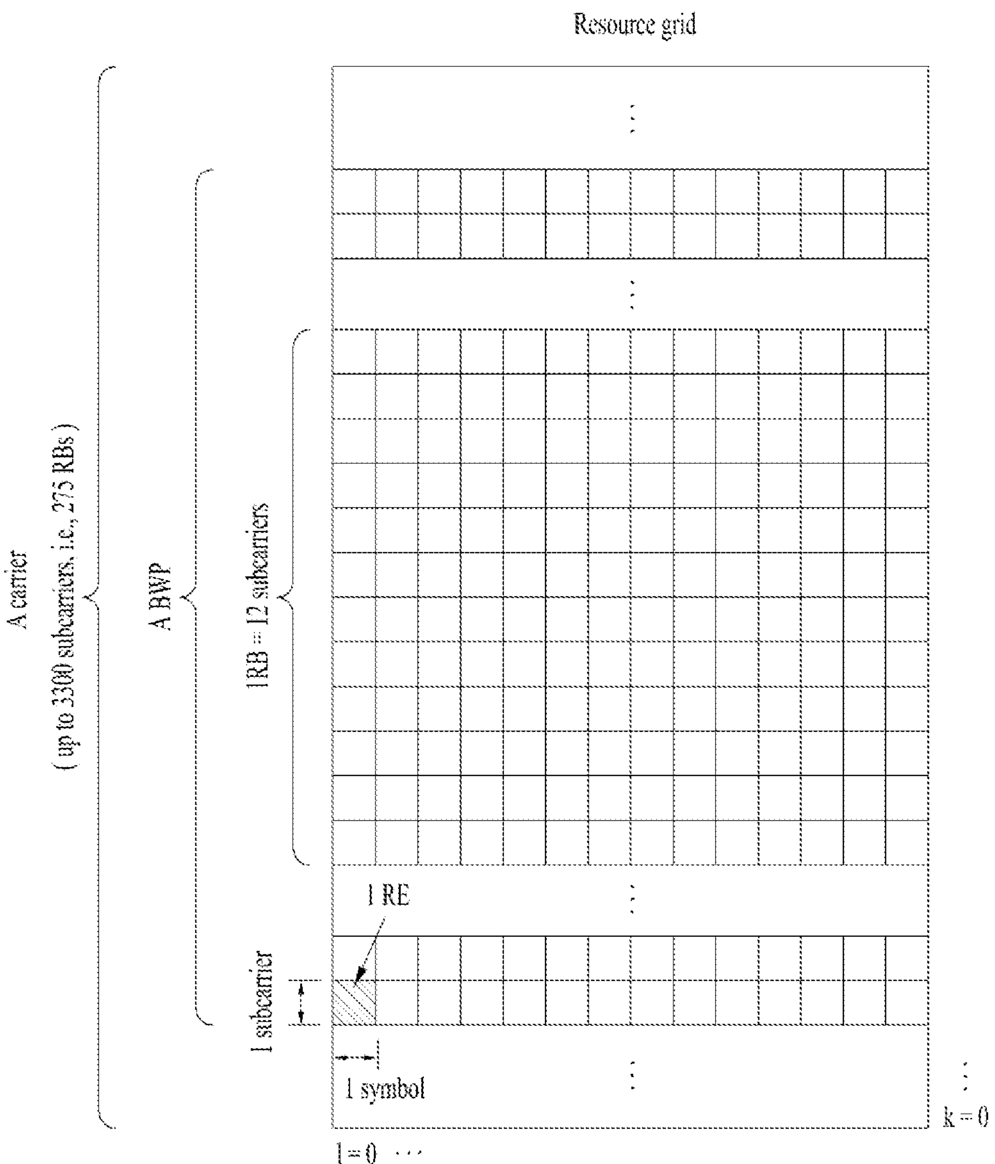
FIG. 5 illustrates the slot structure of an NR frame to which embodiment(s) are applicable.

FIG. 5 illustrates the slot structure of a NR frame to which the present disclosure is applicable.

Referring to FIG. 5, one slot includes a plurality of symbols in the time domain. For example, one slot may include 14 symbols in a normal CP and 12 symbols in an extended CP. Alternatively, one slot may include 7 symbols in the normal CP and 6 symbols in the extended CP.

A carrier may include a plurality of subcarriers in the frequency domain. A resource block (RB) is defined as a plurality of consecutive subcarriers (e.g., 12 subcarriers) in the frequency domain. A bandwidth part (BWP) may be defined as a plurality of consecutive (P)RBs in the frequency domain, and the BWP may correspond to one numerology (e.g., SCS, CP length, etc.). The carrier may include up to N (e.g., 5) BWPs. Data communication may be conducted in an activated BWP. In a resource grid, each element may be referred to as a resource element (RE) and may be mapped to one complex symbol.

The wireless interface between UEs or the wireless interface between a UE and a network may be composed of an L1 layer, an L2 layer, and an L3 layer. In various embodiments of the present disclosure, the L1 layer may represent a physical layer. The L2 layer may represent, for example, at least one of a MAC layer, an RLC layer, a PDCP layer, and an SDAP layer. The L3 layer may represent, for example, an RRC layer.

Hereinafter, V2X or sidelink (SL) communication will be described.

FIG. 6 illustrates a radio protocol architecture for SL communication. Specifically, FIG. 6-(*a*) shows a user plane protocol stack of NR, and FIG. 6-(*b*) shows a control plane protocol stack of NR.

Hereinafter, a sidelink synchronization signal (SLSS) and synchronization information will be described.

The SLSS is an SL-specific sequence, and may include a primary sidelink synchronization signal (PSSS) and a secondary sidelink synchronization signal (SSSS). The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, the UE may detect an initial signal and acquire synchronization using the S-PSS. For example, the UE may acquire detailed synchronization using the S-PSS and the S-SSS, and may detect a synchronization signal ID.

A physical sidelink broadcast channel (PSBCH) may be a (broadcast) channel on which basic (system) information that the UE needs to know first before transmission and reception of an SL signal is transmitted. For example, the basic information may include SLSS related information, a duplex mode (DM), time division duplex uplink/downlink (TDD UL/DL) configuration, resource pool related information, the type of an application related to the SLSS, a subframe offset, and broadcast information. For example, for evaluation of PSBCH performance, the payload size of PSBCH in NR V2X may be 56 bits including CRC of 24 bits.

The S-PSS, S-SSS, and PSBCH may be included in a block format (e.g., an SL synchronization signal (SS)/PSBCH block, hereinafter sidelink-synchronization signal block (S-SSB)) supporting periodic transmission. The S-SSB may have the same numerology (i.e., SCS and CP length) as a physical sidelink control channel (PSCCH)/physical sidelink shared channel (PSSCH) in the carrier, and the transmission bandwidth thereof may be within a (pre)set sidelink BWP (SL BWP). For example, the bandwidth of the S-SSB may be 11 resource blocks (RBs). For example, the PSBCH may span 11 RBs. The frequency position of the S-SSB may be (pre)set. Accordingly, the UE does not need to perform hypothesis detection at a frequency to discover the S-SSB in the carrier.

In the NR SL system, a plurality of numerologies having different SCSs and/or CP lengths may be supported. In this case, as the SCS increases, the length of the time resource in which the transmitting UE transmits the S-SSB may be shortened. Thereby, the coverage of the S-SSB may be narrowed. Accordingly, in order to guarantee the coverage of the S-SSB, the transmitting UE may transmit one or more S-SSBs to the receiving UE within one S-SSB transmission period according to the SCS. For example, the number of S-SSBs that the transmitting UE transmits to the receiving UE within one S-SSB transmission period may be preconfigured or configured for the transmitting UE. For example, the S-SSB transmission period may be 160 ms. For example, for all SCSs, the S-SSB transmission period of 160 ms may be supported.

For example, when the SCS is 15 kHz in FR1, the transmitting UE may transmit one or two S-SSBs to the receiving UE within one S-SSB transmission period. For example, when the SCS is 30 kHz in FR1, the transmitting UE may transmit one or two S-SSBs to the receiving UE within one S-SSB transmission period. For example, when the SCS is 60 kHz in FR1, the transmitting UE may transmit one, two, or four S-SSBs to the receiving UE within one S-SSB transmission period.

For example, when the SCS is 60 kHz in FR2, the transmitting UE may transmit 1, 2, 4, 8, 16 or 32 S-SSBs to the receiving UE within one S-SSB transmission period. For example, when SCS is 120 kHz in FR2, the transmitting UE may transmit 1, 2, 4, 8, 16, 32 or 64 S-SSBs to the receiving UE within one S-SSB transmission period.

When the SCS is 60 kHz, two types of CPs may be supported. In addition, the structure of the S-SSB transmitted from the transmitting UE to the receiving UE may depend on the CP type. For example, the CP type may be normal CP (NCP) or extended CP (ECP). Specifically, for example, when the CP type is NCP, the number of symbols to which the PSBCH is mapped in the S-SSB transmitted by the transmitting UE may be 9 or 8. On the other hand, for example, when the CP type is ECP, the number of symbols to which the PSBCH is mapped in the S-SSB transmitted by the transmitting UE may be 7 or 6. For example, the PSBCH may be mapped to the first symbol in the S-SSB transmitted by the transmitting UE. For example, upon receiving the S-SSB, the receiving UE may perform an automatic gain control (AGC) operation in the period of the first symbol for the S-SSB.

FIG. 7 illustrates UEs performing V2X or SL communication.

Referring to FIG. 7, in V2X or SL communication, the term UE may mainly refer to a user's UE. However, when network equipment such as a BS transmits and receives signals according to a communication scheme between UEs, the BS may also be regarded as a kind of UE. For example, UE 1 may be the first device 100, and UE 2 may be the second device 200.

For example, UE 1 may select a resource unit corresponding to a specific resource in a resource pool, which represents a set of resources. Then, UE 1 may transmit an SL signal through the resource unit. For example, UE 2, which is a receiving UE, may receive a configuration of a resource pool in which UE 1 may transmit a signal, and may detect a signal of UE 1 in the resource pool.

Here, when UE 1 is within the connection range of the BS, the BS may inform UE 1 of a resource pool. On the other hand, when the UE 1 is outside the connection range of the BS, another UE may inform UE 1 of the resource pool, or UE 1 may use a preconfigured resource pool.

In general, the resource pool may be composed of a plurality of resource units, and each UE may select one or multiple resource units and transmit an SL signal through the selected units.

Figure 8:
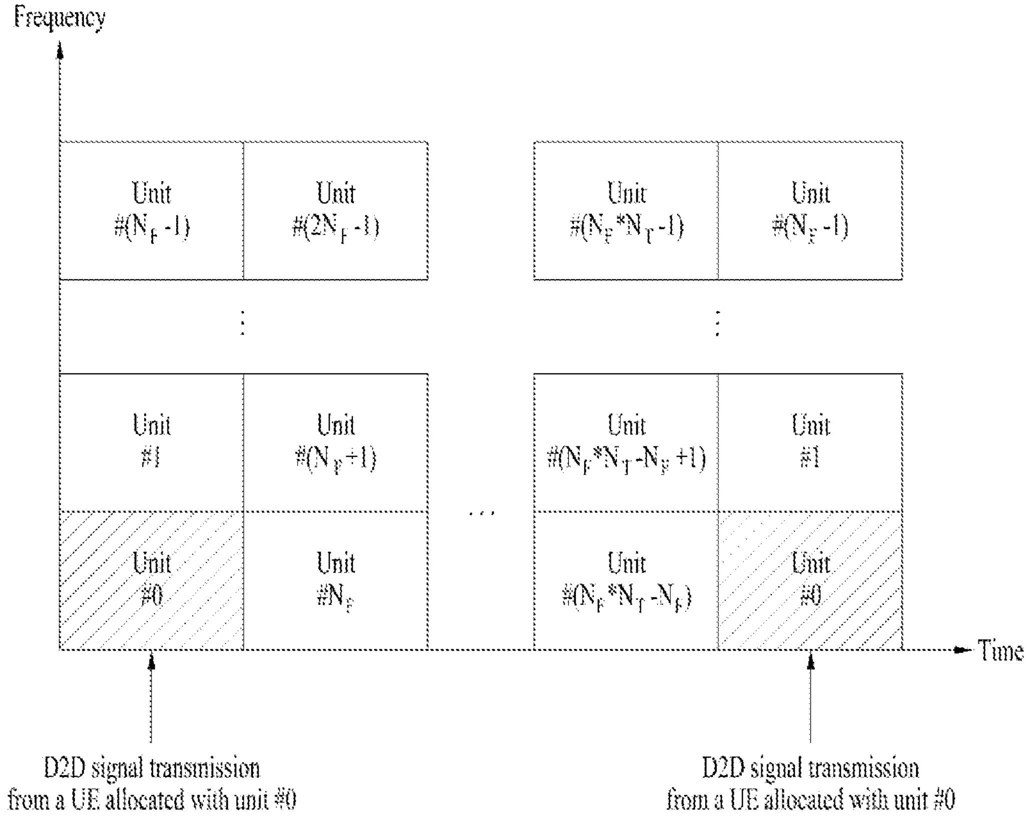
FIG. 8 illustrates resource units for V2X or SL communication.

FIG. 8 illustrates resource units for V2X or SL communication.

Referring to FIG. 8, the frequency resources of a resource pool may be divided into $N_F$ sets, and the time resources of the resource pool may be divided into $N_T$ sets. Accordingly, a total of $N_F*N_T$ resource units may be defined in the resource pool. FIG. 8 shows an exemplary case where the resource pool is repeated with a periodicity of NT subframes.

As shown in FIG. 8, one resource unit (e.g., Unit #0) may appear periodically and repeatedly. Alternatively, in order to obtain a diversity effect in the time or frequency dimension, an index of a physical resource unit to which one logical resource unit is mapped may change in a predetermined pattern over time. In this structure of resource units, the resource pool may represent a set of resource units available to a UE which intends to transmit an SL signal.

Resource pools may be subdivided into several types. For example, according to the content in the SL signal transmitted in each resource pool, the resource pools may be divided as follows.

(1) Scheduling assignment (SA) may be a signal including information such as a position of a resource through which a transmitting UE transmits an SL data channel, a modulation and coding scheme (MCS) or multiple input multiple output (MIMO) transmission scheme required for demodulation of other data channels, and timing advance (TA). The SA may be multiplexed with SL data and transmitted through the same resource unit. In this case, an SA resource pool may represent a resource pool in which SA is multiplexed with SL data and transmitted. The SA may be referred to as an SL control channel.

(2) SL data channel (physical sidelink shared channel (PSSCH)) may be a resource pool through which the transmitting UE transmits user data. When the SA and SL data are multiplexed and transmitted together in the same resource unit, only the SL data channel except for the SA information may be transmitted in the resource pool for the SL data channel. In other words, resource elements (REs) used to transmit the SA information in individual resource units in the SA resource pool may still be used to transmit the SL data in the resource pool of the SL data channel. For example, the transmitting UE may map the PSSCH to consecutive PRBs and transmit the same.

(3) The discovery channel may be a resource pool used for the transmitting UE to transmit information such as the ID thereof. Through this channel, the transmitting UE may allow a neighboring UE to discover the transmitting UE.

Even when the SL signals described above have the same content, they may use different resource pools according to the transmission/reception properties of the SL signals. For example, even when the SL data channel or discovery message is the same among the signals, it may be classified into different resource pools according to determination of the SL signal transmission timing (e.g., transmission at the reception time of the synchronization reference signal or transmission by applying a predetermined TA at the reception time), a resource allocation scheme (e.g., the BS designates individual signal transmission resources to individual transmitting UEs or individual transmission UEs select individual signal transmission resources within the resource pool), signal format (e.g., the number of symbols occupied by each SL signal in a subframe, or the number of subframes used for transmission of one SL signal), signal strength from a BS, the strength of transmit power of an SL UE, and the like.

Hereinafter, resource allocation in the SL will be described.

FIG. 9 illustrates a procedure in which UEs perform V2X or SL communication according to a transmission mode. In various embodiments of the present disclosure, the transmission mode may be referred to as a mode or a resource allocation mode. Hereinafter, for simplicity, the transmission mode in LTE may be referred to as an LTE transmission mode, and the transmission mode in NR may be referred to as an NR resource allocation mode.

For example, FIG. 9-(*a*) illustrates a UE operation related to LTE transmission mode 1 or LTE transmission mode 3. Alternatively, for example, FIG. 9-(*a*) illustrates a UE operation related to NR resource allocation mode 1. For example, LTE transmission mode 1 may be applied to general SL communication, and LTE transmission mode 3 may be applied to V2X communication.

For example, FIG. 9-(*b*) illustrates a UE operation related to LTE transmission mode 2 or LTE transmission mode 4. Alternatively, for example, FIG. 9-(*b*) illustrates a UE operation related to NR resource allocation mode 2.

Referring to FIG. 9-(*a*), in LTE transmission mode 1, LTE transmission mode 3 or NR resource allocation mode 1, the BS may schedule an SL resource to be used by the UE for SL transmission. For example, the BS may perform resource scheduling for UE 1 through PDCCH (more specifically, downlink control information (DCI)), and UE 1 may perform V2X or SL communication with UE 2 according to the resource scheduling. For example, UE 1 may transmit sidelink control information (SCI) to UE 2 on a physical sidelink control channel (PSCCH), and then transmit data which is based on the SCI to UE 2 on a physical sidelink shared channel (PSSCH).

For example, in NR resource allocation mode 1, the UE may be provided with or allocated resources for one or more SL transmissions of a transport block (TB) from the BS through a dynamic grant. For example, the BS may provide a resource for transmission of the PSCCH and/or PSSCH to the UE using the dynamic grant. For example, the transmitting UE may report the SL hybrid automatic repeat request (HARQ) feedback received from the receiving UE to the BS. In this case, the PUCCH resource and timing for reporting the SL HARQ feedback to the BS may be determined based on an indication in the PDCCH through the BS is to allocate a resource for SL transmission.

For example, DCI may include a slot offset between DCI reception and the first SL transmission scheduled by the DCI. For example, the minimum gap between the DCI scheduling a SL transmission resource and the first scheduled SL transmission resource may not be shorter than the processing time of the corresponding UE.

For example, in NR resource allocation mode 1, the UE may be periodically provided with or allocated a resource set from the BS for a plurality of SL transmissions through a configured grant. For example, the configured grant may include configured grant type 1 or configured grant type 2. For example, the UE may determine a TB to be transmitted in each occasion indicated by a given configured grant.

For example, the BS may allocate SL resources to the UE on the same carrier, and may allocate SL resources to the UE on different carriers.

For example, an NR BS may control LTE-based SL communication. For example, the NR BS may transmit NR DCI to the UE to schedule an LTE SL resource. In this case, for example, a new RNTI for scrambling the NR DCI may be defined. For example, the UE may include an NR SL module and an LTE SL module.

For example, after the UE including the NR SL module and the LTE SL module receives NR SL DCI from the gNB, the NR SL module may transform the NR SL DCI to LTE DCI type 5A, and the NR SL module may deliver LTE DCI type 5A to the LTE SL module in units of X ms. For example, the LTE SL module may apply activation and/or release to the first LTE subframe Z ms after the LTE SL module receives LTE DCI format 5A from the NR SL module. For example, the X may be dynamically indicated using a field of DCI. For example, the minimum value of X may depend on the UE capability. For example, the UE may report a single value according to the UE capability. For example, X may be a positive number.

Referring to FIG. 9-(*b*), in LTE transmission mode 2, LTE transmission mode 4, or NR resource allocation mode 2, the UE may determine AN SL resource within the SL resources configured by the BS/network or the preconfigured SL resources. For example, the configured SL resources or the preconfigured SL resources may be a resource pool. For example, the UE may autonomously select or schedule a resource for SL transmission. For example, the UE may autonomously select a resource within the configured resource pool to perform SL communication. For example, the UE may select a resource within a selection window by performing a sensing and resource (re)selection procedure. For example, the sensing may be performed on a per sub-channel basis. In addition, UE 1, which has selected a resource within the resource pool, may transmit SCI to UE 2 through the PSCCH, and then transmit data, which is based on the SCI, to UE 2 through the PSSCH.

For example, a UE may assist in selecting an SL resource for another UE. For example, in NR resource allocation mode 2, the UE may receive a configured grant for SL transmission. For example, in NR resource allocation mode 2, the UE may schedule SL transmission of another UE. For example, in NR resource allocation mode 2, the UE may reserve an SL resource for blind retransmission.

For example, in NR resource allocation mode 2, UE 1 may indicate the priority of SL transmission to UE 2 using the SCI. For example, UE 2 may decode the SCI. UE 2 may perform sensing and/or resource (re)selection based on the priority. For example, the resource (re)selection procedure may include an operation of identifying candidate resources in a resource selection window by UE 2, and an operation of selecting, by UE 2, a resource for (re)transmission from among the identified candidate resources. For example, the resource selection window may be a time interval during which the UE selects the resource for SL transmission. For example, after UE 2 triggers resource (re)selection, the resource selection window may start at T1≥0. The resource selection window may be limited by the remaining packet delay budget of UE 2. For example, in the operation of identifying the candidate resources in the resource selection window by UE 2, a specific resource may be indicated by the SCI received by UE 2 from UE 1. When the L1 SL RSRP measurement value for the specific resource exceeds an SL RSRP threshold, UE 2 may not determine the specific resource as a candidate resource. For example, the SL RSRP threshold may be determined based on the priority of the SL transmission indicated by the SCI received by UE 2 from UE 1 and the priority of the SL transmission on the resource selected by UE 2.

For example, the L1 SL RSRP may be measured based on an SL demodulation reference signal (DMRS). For example, one or more PSSCH DMRS patterns may be configured or preconfigured for each resource pool in the time domain. For example, PDSCH DMRS configuration type 1 and/or type 2 may be the same as or similar to the frequency domain pattern of the PSSCH DMRS. For example, the exact DMRS pattern may be indicated by the SCI. For example, in NR resource allocation mode 2, the transmitting UE may select a specific DMRS pattern from among DMRS patterns configured or preconfigured for the resource pool.

For example, in NR resource allocation mode 2, based on the sensing and resource (re)selection procedure, the transmitting UE may perform initial transmission of a TB without reservation. For example, based on the sensing and resource (re)selection procedure, using the SCI associated with a first TB, the transmitting UE may reserve the SL resource for initial transmission of a second TB.

For example, in NR resource allocation mode 2, the UE may reserve a resource for feedback-based PSSCH retransmission through signaling related to previous transmission of the same TB. For example, the maximum number of SL resources reserved by one transmission including the current transmission may be 2, 3, or 4. For example, the maximum number of SL resources may be the same regardless of whether HARQ feedback is enabled. For example, the maximum number of HARQ (re)transmissions for one TB may be limited by configuration or pre-configuration. For example, the maximum number of HARQ (re)transmissions may be up to 32. For example, when the configuration or pre-configuration is not present, the maximum number of HARQ (re)transmissions may be unspecified. For example, the configuration or pre-configuration may be for the transmitting UE. For example, in NR resource allocation mode 2, HARQ feedback for releasing resources not used by the UE may be supported.

For example, in NR resource allocation mode 2, the UE may indicate to another UE one or more sub-channels and/or slots used by the UE, using the SCI. For example, the UE may indicate to another UE one or more sub-channels and/or slots reserved by the UE for PSSCH (re)transmission, using SCI. For example, the minimum allocation unit of the SL resource may be a slot. For example, the size of the sub-channel may be configured for the UE or may be preconfigured.

Hereinafter, sidelink control information (SCI) will be described.

Control information transmitted by the BS to the UE on the PDCCH may be referred to as downlink control information (DCI), whereas control information transmitted by the UE to another UE on the PSCCH may be referred to as SCI. For example, before decoding the PSCCH, the UE may be aware of the start symbol of the PSCCH and/or the number of symbols of the PSCCH. For example, the SCI may include SL scheduling information. For example, the UE may transmit at least one SCI to another UE to schedule the PSSCH. For example, one or more SCI formats may be defined.

For example, the transmitting UE may transmit the SCI to the receiving UE on the PSCCH. The receiving UE may decode one SCI to receive the PSSCH from the transmitting UE.

For example, the transmitting UE may transmit two consecutive SCIs (e.g., 2-stage SCI) to the receiving UE on the PSCCH and/or the PSSCH. The receiving UE may decode the two consecutive SCIs (e.g., 2-stage SCI) to receive the PSSCH from the transmitting UE. For example, when the SCI configuration fields are divided into two groups in consideration of the (relatively) high SCI payload size, the SCI including a first SCI configuration field group may be referred to as first SCI or 1st SCI, and the SCI including a second SCI configuration field group may be referred to as second SCI or 2nd SCI. For example, the transmitting UE may transmit the first SCI to the receiving UE on the PSCCH. For example, the transmitting UE may transmit the second SCI to the receiving UE on the PSCCH and/or the PSSCH. For example, the second SCI may be transmitted to the receiving UE on the (independent) PSCCH, or may be piggybacked together with data and transmitted on the PSSCH. For example, the two consecutive SCIs may be applied for different transmissions (e.g., unicast, broadcast, or groupcast).

For example, the transmitting UE may transmit some or all of the following information to the receiving UE through SCI. Here, for example, the transmitting UE may transmit some or all of the following information to the receiving UE through the first SCI and/or the second SCI:

- PSSCH and/or PSCCH related resource allocation information, for example, the positions/number of time/frequency resources, resource reservation information (e.g., periodicity); and/or
- SL CSI report request indicator or SL (L1) RSRP (and/or SL (L1) RSRQ and/or SL (L1) RSSI) report request indicator; and/or
- SL CSI transmission indicator (or SL (L1) RSRP (and/or SL (L1) RSRQ and/or SL (L1) RSSI) information transmission indicator) (on PSSCH); and/or
- MCS information; and/or
- transmit power information; and/or
- L1 destination ID information and/or L1 source ID information; and/or
- SL HARQ process ID information; and/or
- new data indicator (NDI) information; and/or
- redundancy version (RV) information; and/or
- (transmission traffic/packet related) QoS information; e.g., priority information; and/or
- SL CSI-RS transmission indicator or information on the number of (transmitted) SL CSI-RS antenna ports;
- Location information about the transmitting UE or location (or distance/area) information about a target receiving UE (to which a request for SL HARQ feedback is made); and/or
- information about a reference signal (e.g., DMRS, etc.) related to decoding and/or channel estimation of data transmitted on the PSSCH, for example, information related to a pattern of a (time-frequency) mapping resource of DMRS, rank information, antenna port index information.

For example, the first SCI may include information related to channel sensing. For example, the receiving UE may decode the second SCI using the PSSCH DMRS. A polar code used for the PDCCH may be applied to the second SCI. For example, in the resource pool, the payload size of the first SCI may be the same for unicast, groupcast and broadcast. After decoding the first SCI, the receiving UE does not need to perform blind decoding of the second SCI. For example, the first SCI may include scheduling information about the second SCI.

In various embodiments of the present disclosure, since the transmitting UE may transmit at least one of SCI, the first SCI, and/or the second SCI to the receiving UE on the PSCCH, the PSCCH may be replaced/substituted with at least one of the SCI, the first SCI, and/or the second SCI. Additionally/alternatively, for example, the SCI may be replaced/substituted with at least one of the PSCCH, the first SCI, and/or the second SCI. Additionally/alternatively, for example, since the transmitting UE may transmit the second SCI to the receiving UE on the PSSCH, the PSSCH may be replaced/substituted with the second SCI.

Hereinafter, synchronization acquisition by an SL UE will be described.

In TDMA and FDMA systems, accurate time and frequency synchronization is essential. Inaccurate time and frequency synchronization may lead to degradation of system performance due to inter-symbol interference (ISI) and inter-carrier interference (ICI). The same is true for V2X. For time/frequency synchronization in V2X, a sidelink synchronization signal (SLSS) may be used in the PHY layer, and master information block-sidelink-V2X (MIB-SL-V2X) may be used in the RLC layer.

Hybrid Automatic Repeat Request (HARQ) is the combination of FEC and ARQ, and can improve performance by checking whether data received by a physical layer contains an error that cannot be decoded, and requesting retransmission if an error occurs.

In case of sidelink unicast and groupcast, HARQ feedback and HARQ combining in a physical layer may be supported. For example, when an Rx UE operates in resource allocation mode 1 or 2, the Rx UE may receive PSSCH from a Tx UE, and the Rx UE may transmit HARQ-ACK feedback on the PSSCH to the Tx UE using a Sidelink Feedback Control Information (SFCI) format through Physical Sidelink Control Channel (PSFCH).

When side link HARQ feedback is enabled for unicast, in case of a non-Code Block Group (non-CBG) operation, when the Rx UE successfully decodes a corresponding transport block, the Rx UE may generate HARQ-ACK. Then, the Rx UE may transmit the HARQ-ACK to the Tx UE. After the Rx UE has decoded an associated PSCCH targeting the Rx UE, if the Rx UE fails to successfully decode the corresponding transport block, the Rx UE may generate HARQ-NACK. Then, the Rx UE may transmit the HARQ-NACK to the Tx UE.

When side link HARQ feedback is enabled for groupcast, a UE may determine whether to send HARQ feedback based on a Tx-Rx distance and/or RSRP. In case of a non-CBG operation, two kinds of options may be supported.

(1) Option 1: When an Rx UE fails to decode a corresponding transport block after decoding an associated PSCCH, the Rx UE may transmit HARQ-NACK on PSFCH. Otherwise, the Rx UE may not transmit a signal on PSFCH.

(2) Option 2: When an Rx UE successfully decodes a corresponding transport block, the Rx UE may transmit HARQ-ACK on PSFCH. When the Rx UE fails to decode the corresponding transport block successfully after decoding an associated PSCCH targeting the Rx UE, the Rx UE may transmit HARQ-NACK on PSFCH.

In case of mode 1 resource allocation, the time between HARQ feedback transmission on PSFCH and PSSCH may be set (in advance). In case of unicast and groupcast, if retransmission in sidelink is required, it may be indicated to a BS by an in-coverage UE that uses PUCCH. A Tx UE may transmit an indication to a serving BS of the Tx UE in a form such as a Scheduling Request/Buffer Status Report (SR/BSR) rather than a form of HARQ ACK/NACK. In addition, even if the BS does not receive the indication, the BS may schedule a side link retransmission resource to the UE.

In case of mode 2 resource allocation, the time between HARQ feedback transmission on PSFCH and PSSCH may be set (in advance).

Hereinafter, sidelink congestion control will be described.

When a UE determines a sidelink Tx resource by itself, the UE also determines a size and frequency of a resource used by the UE. Of course, due to constraints from a network, etc., using a resource size or frequency of a predetermined level or higher may be limited. However, when all UEs use relatively large resources in a situation that many UEs are concentrated in a specific area at a specific timing, overall performance may be considerably due to mutual interference.

Accordingly, a UE needs to observe a channel situation. If it is determined that an excessive amount of resources are being consumed, it is preferable that the UE takes an operation in the form of reducing its own resource use. In the present specification, this may be defined as Congestion Control (CR). For example, a UE may determine whether the energy measured in a unit time/frequency resource is equal to or higher than a predetermined level, and adjust an amount and frequency of its Tx resource according to a ratio of the unit time/frequency resource from which the energy equal to or higher than the predetermined level is observed. In the present specification, the ratio of the time/frequency resources from which the energy equal to or higher than the predetermined level is observed may be defined as a Channel Busy Ratio (CBR). The UE may measure the CBR with respect to a channel/frequency. Additionally, the UE may transmit the measured CBR to a network/BS.

Intelligent Transport System (ITS) Related Message

For messages defined in the current ITS/SAE (the Society of Automotive Engineers) scenario (for example, ITS communication standards defined in ITS specifications including ETSI TS 103 300-3 or communication standards defined by SAE), transmission methods therefor may be divided into periodic transmission and/or aperiodic transmission (e.g., event-triggered transmission), depending on the type of message. The periodic transmission basically means that a message is generated/transmitted according to a (pre)defined/configured message transmission cycle. In addition, the periodic transmission may mean that message generation/transmission is allowed at a specific point in time within the defined/configured cycle if (pre)defined/configured message generation/transmission triggering conditions are satisfied. In other words, when a message is defined to be transmitted periodically, message generation/transmission therefor needs to be performed according to the (pre)defined/configured cycle even if there is no event satisfying the (pre)defined/configured message generation/transmission triggering conditions. This means that the time interval between previous message transmission (e.g., N-th message transmission) and next message transmission (e.g., (N+1)-th message transmission) does not exceed a (pre)defined/configured time interval (e.g., message generation/transmission cycle), regardless of the occurrence of events satisfying the message generation/transmission triggering conditions. Herein, the ITS/SAE scenario may mean scenarios related to ITS standards and/or SAE standards.

FIG. 10 is a diagram for explaining a vulnerable road user (VRU) awareness message (VAM) defined in the ITS/SAE scenario.

In the ITS/SAE scenario, a message composition/format is defined to be divided into mandatory containers/data/fields and optional containers/data/fields.

Referring to FIG. 10, a VAM defined for the purpose of VRU awareness basic services may include a plurality of containers. Each container consists of one or more data fields (DFs). Additionally, in the ITS scenario, each container/DF may be categorized as either a mandatory container/DF that should be included when transmitting a message or an optional container/DF in the ITS scenario.

DFs such as path history (see Table 5) and path prediction may be included and transmitted in messages intended for VRU protection such as VAMs. In the above ITS scenario, the path history/prediction DF may be expressed by one or more but not more than 40 path points. Each path point may be composed of path position information, which indicates the location of a VRU path, and path delta time information, which indicates what point in time the path position information is related to.

TABLE 5

| | |
|---|---|
| Description | This DF represents the VRU's recent movement over some past time and/or distance. It consists of a list of path points, each represented as DF PathPoint. The list of path points may consist of up to 40 elements (see further details in clause 7.3.6). |

TABLE 5-continued

| | |
|---|---|
| Insertion in VAM | Optional. |
| Data setting and presentation requirements | The DF shall be presented as specified in ETSI TS 102 894-2 [7] A117 pathHistory. It consists of up to 40 PathPoint, as specified in ETSI TS 102 894-2 [7] A118. Each PathPoint consists of pathPosition (A109) and an optional pathDeltaTime (A47) with granularity of 10 ms. |

However, in the ITS/SAE scenario, specific message operation methods, such as under what conditions the optional container/DF needs to be included and transmitted in a message (for example, VRU position, surrounding conditions, communication environment, etc.), are not specified. Regarding a DF composed of one or multiple path points such as path history/prediction, it is also not specified under what conditions/criteria the number of path points that need to be included (or are capable of being included) in a message is adjusted/determined. Depending on whether the optional container/DF such as the path history/prediction DF is included in a VRU message or how many path points are included in a VRU message if the path history/prediction DF is included and transmitted in the message, the size of the VRU message generated/transmitted may be variable. In this case, if possible, it is desirable that the size of a message transmitted by a VRU is configured such that the size of data transmitted by the VRU (or the size of data containing information on the VRU) is reduced. The reason for this is that the message size may impact the amount of data traffic that the UE transmits to a peer VRU/vehicle/RSU/BS and/or affect the transmission power/power/time length, etc. required for the UE to transmit the message.

As described above, for messages defined in the ITS/SAE scenario, transmission methods therefor may be divided into periodic transmission and/or aperiodic transmission (e.g., event-triggered transmission), depending on the type of message. Here, the periodic transmission basically means that a message is generated/transmitted according to a (pre)defined/configured message transmission cycle. If (pre) defined/configured message triggering conditions are satisfied, message generation/transmission may be performed in a time period within the configured cycle.

For example, referring to Table 6, in the ITS/SAE scenario, when the UE is in the VRU-ACTIVE STANDALONE state and when at least one of the following conditions is satisfied, VAM generation/transmission may be triggered.

TABLE 6

1) The time elapsed since the last time the individual VAM was transmitted exceeds T_GenVamMax.
2) The Euclidian absolute distance between the current estimated position of the reference point of the VRU and
the estimated position of the reference point lastly included in an individual VAM exceeds a pre-defined threshold minReferencePointPositionChangeThreshold.
3) The difference between the current estimated ground speed of the reference point of the VRU and the estimated absolute speed of the reference point of the VRU lastly included in an individual VAM exceeds a pre-defined threshold minGroundSpeedChangeThreshold.
4) The difference between the orientation of the vector of the current estimated ground velocity of the reference point of the VRU and the estimated orientation of the vector of the ground velocity of the reference point of the VRU lastly included in an individual VAM exceeds a pre-defined threshold minGroundVelocityOrientationChangeThreshold.
5) The VRU has determined that there is a difference between the current estimated trajectory interception probability with vehicle(s) or other VRU(s) and the trajectory interception probability with vehicle(s) or other
VRU(s) lastly reported in an individual VAM exceeds a predefined threshold minTrajectoryInterceptionProbChangeThreshold.
6) The originating ITS-S is a VRU in VRU-ACTIVE-STANDALONE VBS state and has decided to join a cluster after its previous individual VAM transmission.
7) VRU has determined that one or more new vehicles or other VRUs have satisfied the following conditions simultaneously after the lastly transmitted VAM:
   - coming closer than minimum safe lateral distance (MSLaD) laterally:
   - coming closer than minimum safe longitudinal distance (MSLoD) longitudinally;
   - coming closer than minimum safe vertical distance (MSVD) vertically.

In the ITS/SAE scenario, the roles/states of the VRU or UE are defined as shown in Table 7 and Table 8. The VRU or UE may transition to the VRU_ROLE_OFF state when it is determined that the VRU or UE is in a zero-risk area (e.g., inside a car/bus/building). In the VRU_ROLE_OFF state, the VRU or UE does not perform transmission/reception of a VAM, which is a VRU message.

TABLE 7

| VRU role | Specification | Valid VRU profiles | Valid VRU types | Additional explanation |
|---|---|---|---|---|
| VRU_ROLE_ON | The device user is considered as a VRU. Based on information received from VRU profile management entity, the VBS shall check the type of VRU and the profile of VRU. It shall also handle the VBS clustering stats and provide services to other entities as defined in clause 5. | ALL | ALL | Ths VBS state should be changed according to the condition of VRU device user as notified by the VRU profile Management entity. The VRU device can send VAMs, receive VAMs, or both while checking the position of VRU device user through the PoTi entity. Except for VRUs of profile 3, it may execute the VRU clustering functions (see clause 5). |

TABLE 7-continued

| VRU role | Specification | Valid VRU profiles | Valid VRU types | Additional explanation |
|---|---|---|---|---|
| VRU_ROLE_OFF | The device user is not considered as a VRU. The VRU device shall neither send nor receive VAMs. | ALL | ALL | The VRU is located in a "zero-risk" geographical area, for example in a bus, in a passenger car, etc. The VBS remains operational in this state to monitor any notification that the role has changed to VRU_ROLE_ON. |

TABLE 8

| VBS State | Specification | Valid VRU profiles | Valid VRU types | Additional explanation |
|---|---|---|---|---|
| VRU-IDLE | The device user is not considered as a VRU | ALL | ALL | The VRU role as defined in clause 4.2 is VRU_ROLE_OFF |
| VRU-ACTIVE-STANDALONE | VAMs or CAMs (in case of VRU Profile 2) are transmitted with information related to only that VRU. | ALL | VRU-St, VRU-Tx | In this state a VRU ITS-S may indicate an intention to join a cluster, or indicate that it has just left a cluster. |
| VRU-ACTIVE-CLUSTER-LEADER | VAMs are transmitted and include a container with specific data elements related to the cluster | VRU profile 1, VRU profile 2 | VRU-St | |
| VRU-PASSIVE | The VRU device does not transmit VAMs | ALL except VRU profile 3 | VRU-St, VRU-Tx | The VRU is member of a cluster or located in a low-risk geographical area defined in clause 3.1 (see FCOM03 in ETSI TS 103 300-2 [1]). In the case the area rules authorize the traffic of motor vehicles, the VBS can also remain in VRU-ACTIVE-STANDALONE VBS state and increase the periodicity of the VAMs. |

In the ITS/SAE scenario, when it is determined that the VRU or UE is in a low-risk area, the VRU or UE may transition to the VRU-PASSIVE state. In the VRU-PASSIVE state, the VRU or UE is allowed not to perform VAM transmission. In summary, in the ITS/SAE scenario, the VAM is defined as a message that is transmitted periodically. However, it is supported/allowed in the ITS/SAE scenario that the VRU or UE is allowed not to transmit the corresponding message when the VRU or UE is in a zero/low-risk area.

Methods for Event-Triggered Transmission of VRU Message and Methods for Allowing Skipping of Message Transmission Hereinafter, methods of reducing the total amount of data generated for message transmission/exchange in communication between a UE and a server based on event-triggered transmission of periodic messages (VRU message, UE message, VAM, etc.) and/or methods of skipping transmission of some of the periodic messages will be described in detail.

For the sake of explanation convenience, the present disclosure will be described on the assumption that the UE transmits messages containing UE information (e.g., CAM, DENM, VAM, BSM, etc.) to the server. However, this does not impose constraints on the proposed technology. The proposed technology may be equally/similarly applied to transmission of any message (defined/configured to be transmitted periodically) (e.g., CAM, BSM, etc.) transmitted by any entity (e.g., VRU, vehicle, RSU, BS (eNB or gNB), or other servers (e.g., any application servers, ITS servers for a country/region/local government/road administrator, etc.)).

In addition, the present disclosure will be described on the assumption that the message recipient is the server, but the message recipient may be a VRU, a vehicle, an RSU, a BS (eNB or gNB), or other servers (e.g., any application servers, ITS servers for a country/region/local government/road administrator, etc.). In other words, the proposed technology may be equally/similarly applied even if the receiving entity is not the server. In addition, the proposed technology will be described by assuming that the UE performs unicast communication with the server. The proposed technology may be applied equally/similarly to messages transmitted and received between any entities, regardless of cast types (e.g., unicast, multicast (groupcast), broadcast, etc.).

In the following, the term "message generation/transmission triggering event/condition" refers to message generation/transmission triggering events/conditions except a condition that triggers message generation/transmission upon reaching a message transmission time defined by a message transmission cycle. In the context of the VAM, except for Condition 1) described above in Table 6, the remaining conditions (i.e., Conditions 2) to 7)) correspond to the message generation/transmission triggering events/conditions, where Condition 1) may correspond to the condition related to the maximum time interval between message transmissions defined in the ITS scenario or the condition where message generation/transmission is triggered upon reaching the message transmission time defined by the message transmission cycle.

The message generation/transmission triggering events/conditions may include: ① when the Euclidean absolute distance between the current estimated position of the reference point of the UE and the estimated position of the reference point included in the last individual message (e.g., VAM) exceeds a predefined threshold (minReferencePoint-PositionChangeThreshold) (Condition 2) in Table 6); ② when the difference between the current estimated ground speed of the UE reference point and the estimated absolute speed of the reference point included in the last individual message (e.g., VAM) exceeds a predefined threshold (min-GroundSpeedChangeThreshold) (Condition 3) in Table 6); ③ when the difference between the current estimated ground velocity vector direction of the UE reference point and the estimated ground velocity vector direction of the UE reference point included in the last individual message (e.g., VAM) exceeds a predefined threshold (minGroundVelocity-OrientationChangeThreshold) (Condition 4) in Table 6); ④ when the difference between the current estimated trajectory interception probability of the UE with vehicles or other UEs and the trajectory interception probability of vehicles or other VRUs included in the last reported individual message (e.g., VAM) exceeds a predefined threshold (minTrajectoryInterceptionProbChangeThreshold) (Condition 5) in Table 6); ⑤ when the originating ITS-S is a UE in the VRU-ACTIVE-STANDALONE VBS state and it is determined to join a cluster after transmission of a previous individual message (e.g., VAM) (Condition 6) in Table 6); and ⑥ when a VRU satisfies at least one or all of the following conditions after the last transmitted message (e.g., VAM): the VRU approaches one or more new vehicles or other UEs i) in the lateral direction closer than the minimum safe lateral distance (MSLaD); ii) in the longitudinal direction closer than the minimum safe longitudinal distance (MSLoD); or iii) in the vertical direction closer than the minimum safe vertical distance (MSVD) (Condition 7) in Table 6).

FIG. 11 is a diagram for explaining system structures for transmitting and receiving messages between a UE, a server, and surrounding vehicles.

Referring to FIG. 11(*a*), V2X messages may be transmitted/received/exchanged through short-range communication (e.g., ITS G5/DSRC/C-V2X-based short range communication) between UEs.

However, V2X services may be supported through (UL/DL) communication between the UE and BS based on the Uu interface. In this case, supporting V2X services through (UL/DL) communication based on the Uu interface may be useful for providing V2X-related services, especially in the early stages of V2X market adoption when there are not many vehicle/pedestrian UEs equipped with sidelink communication modules. To support the V2X-related services through the Uu link, the service flows and system structures illustrated in FIGS. 11(*b*) and 11(*c*) may be considered.

Referring to FIG. 11(*b*), the UE (i.e., VRU, vehicle, and/or RSU) may transmit information on the UE or receive necessary information through (UL/DL) communication based on the Uu interface.

Alternatively, referring to FIG. 11(*c*), the UE (i.e., VRU, vehicle, and/or RSU) may transmit information on the UE to an application server and receive necessary information through (UL/DL) communication based on the Uu interface. After obtaining the UE-related information (or VRU-related information) from the UE, the application server may transmit/deliver the corresponding information to the ITS server of a country/local government/road administrator. In this case, the ITS server may support V2X services through a flow that enables the ITS server to transmit the corresponding UE information/message to vehicles (i.e., VRUs, UEs, and/or other RSUs), which are the final message/packet recipients, using RSUs via legacy ITS systems based on short-range communication.

In both the structures of FIGS. 11(*b*) and 11(*c*), the UE may have only transmission capability or may have both transmitting and receiving capabilities. Notably, the UE may be implemented to have transmitting capability only for the purpose of power saving and/or implementation simplification. When such a UE exists, vehicles may use the structure (or system structure) shown in FIG. 11(*c*) to obtain information on surrounding UEs and perform operations to protect the UE.

Hereinafter, methods of reducing the amount of data transmitted/received/exchanged between a UE and an application server (and/or the size/frequency of messages transmitted by the UE) will be described in detail on the assumption of the system structure shown in FIG. 11(*b*) and/or 11(*c*).

1. Proposal 1

For a message defined to be transmitted periodically in the ITS/SAE scenario, even when a point in time for message generation/transmission is determined according to a message transmission cycle (which is defined in the ITS/SAE scenario or preconfigured), the UE (or vehicle/RSU/BS/server) may skip transmission of the message if "specific conditions (=CONDITION A)" is satisfied. In addition, if the transmission of the message is skipped based on the specific conditions, the UE or VRU may include "skipping information (=INFO_A) on the previously skipped message transmission" in a (first) message that is transmitted after the skipped message and then transmit the skipping information to the application server. Alternatively, the UE may transmit the skipping information in a separate message. In addition, if the transmission of the message is skipped based on the specific conditions, the amount (and/or type) of data in an optional DF included in the (first) message, which is transmitted after the skipped message, is determined by the number of times that message transmission is skipped (between the timing (point in time) of previous message transmission and the timing (point in time) of next message transmission) and/or the length of the time interval between the previous message transmission and the current message transmission. For example, when transmission of a first message is skipped at a first timing and when transmission of a second message is skipped at a second timing, if a third message is transmitted at a third timing after skipping the transmission, the amount (and/or type) of data in an optional DF included in the third message may be determined based on the number of times that the first and second messages are skipped and/or the interval between the first timing and the third timing (or the interval between the second timing and the third timing).

The above-described specific conditions (CONDITION A) may be defined as follows.

1) First embodiment: The specific conditions (defined in the ITS/SAE scenario or preconfigured) may include a case in which while the point in time for message generation/transmission determined according to the message transmission cycle is reached, any triggering events for message generation/transmission do not occur until the corresponding point in time. Considering the message criteria defined in the ITS/SAE scenario, a message may be generated in the ITS/SAE scenario if at least one of the conditions defined in Table 6 is satisfied. As described above, the message generation/transmission triggering conditions may include the remaining conditions except for Condition 1) among the conditions described in Table 6. In addition, the UE operation described in Proposal 1 may be interpreted as removing Condition 1) from the message triggering conditions in the ITS/SAE scenario.

2) Second embodiment: The specific conditions may be related to the role/state of the UE. For example, the specific conditions may include a case in which the role/state of the UE is a first state (i.e., VRU_ROLE_OFF, VRU-IDLE, or VRU-PASSIVE). According to the ITS/SAE scenario, when the role/state of the UE is the first state (i.e., VRU_ROLE_OFF, VRU-IDLE, or VRU-PASSIVE), the UE is allowed not to generate/transmit (and receive) messages, exceptionally.

The first state refers to a state in which the UE does not need to transmit a message to provide information on the UE to the surroundings. For example, if the UE is a VRU, the first state may mean VRU_ROLE_OFF, VRU-IDLE, or VRU-PASSIVE. On the other hand, a state in which the UE needs to transmit a message to notify the surroundings of information on the UE may be defined as a second state.

The above-described skipping information (=INFO_A) may include at least one piece of the following information.

1) Information on a time at which previous message transmission is skipped (e.g., a time interval and/or a point in time where the previous message transmission is skipped)

Figure 12:
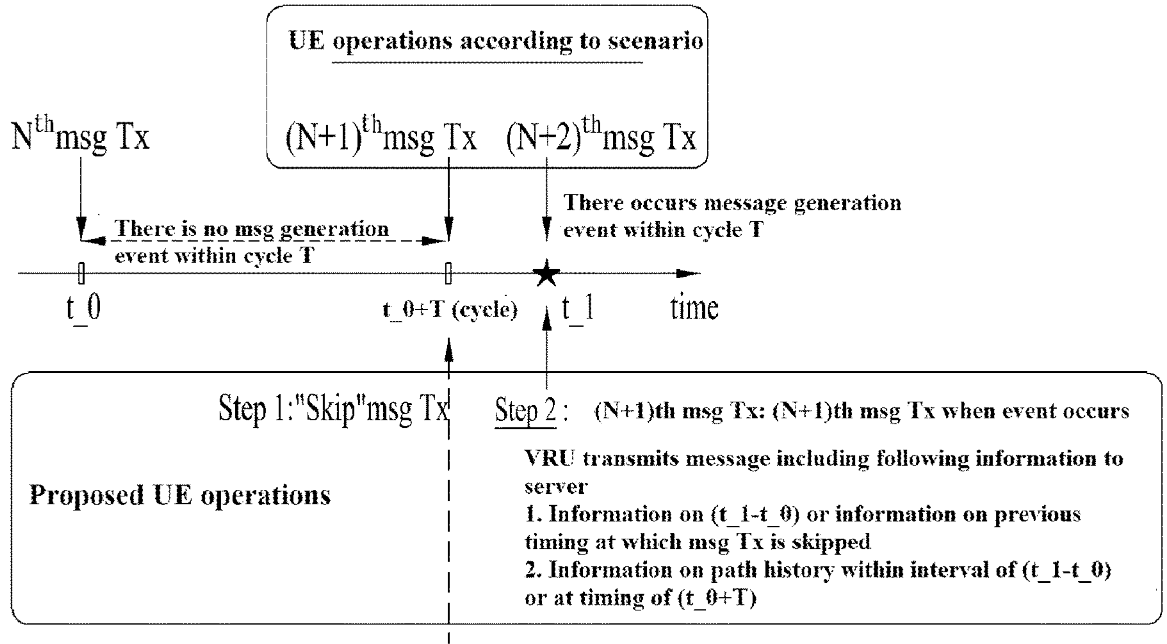
FIGS. 12 and 13 are diagrams for explaining methods by which a UE transmits a message or skip transmission thereof.

- The length of the interval between the previous last message transmission point in time (corresponding to t_0 in FIG. 12) and the current message transmission point in time (corresponding to t_1 in FIG. 12) (T_gap).
- Information on t_0, t_1, and a point in time at which message transmission is skipped (corresponding to (t_0+T) in FIG. 12), the number of times that message transmission is skipped within the interval between t_0 and t_1, and/or the message transmission cycle (e.g., T_GenVamMax or T in FIG. 12).

2) Information on the history of changes in the role/state of the UE between the previous last message transmission point in time and the current message transmission point in time.

3) Information on the role/state of the UE at the point in time when the previous message transmission is skipped within the interval between t_0 and t_1.

4) The number of times that the role/state of the UE transitions between the previous last message transmission point in time and the current message transmission point in time (in particular, the number of times that the UE transitions to a state/role where the UE does not need to perform transmission (and/or reception) of a message (defined/allowed in the ITS scenario)).

The skipping information (=INFO_A) may be included as part of a DF in an (N+1)-th message and then transmitted to the server according to the proposed transmission method. However, the skipping information may also be defined/transmitted in a message different from the (N+1)-th message, or the skipping information may be defined/transmitted as part of a higher layer message during transmission of the (N+1)-th message (or before/after the transmission). If the skipping information (=INFO_A) is included and transmitted as part of a DF in a message, it may require changes in message DFs/containers of the ITS/SAE scenario. As a result, legacy UEs that operate according to the ITS scenario may not be capable of receiving or obtaining the skipping information (=INFO_A). This issue may also arise when the skipping information (=INFO_A) is defined as a message different from other messages (which is generated at the facility layer). However, if the skipping information (=INFO_A) is included as part of a higher layer/protocol message (for example, header/data in application protocols such as MQTT or AMQP), the message definitions in the ITS/SAE scenario may be used as they are.

In addition, the server may use the skipping information (=INFO_A) received from the UE to determine whether the UE actually transmits no message (during the time interval where the previous message transmission is skipped) or whether the UE transmits a message but the server fails to receive the message. If the server determines based on the skipping information (=INFO A) that the UE transmits a message but the server fails to receive the message, the server may request the UE to retransmit the message that the server fails to receive. Alternatively, the server may request the UE to include and transmit information on the message that the server fails to receive or information on the path history of the UE until a point in time when the UE transmits a next message in the corresponding next message.

In addition, regarding the above-described method of determining the amount (and/or type) of data in an optional DF included in a message that is transmitted (first) after skipping a message based on the number of times that the message is skipped (between the point in time of previous message transmission and the point in time of next message transmission) and/or the length of the time interval between the previous message transmission and the current message transmission, the following factors may be considered.

1) An optional DF where the amount/type of data is capable of being adjusted may include path history, path prediction, etc.

2) The amount/type of data included in an optional DF/container may be adjusted according to at least one of the following rules. Specifically, when the UE skips transmission of a (periodic) message at a predetermined/scheduled point in time, the UE may adjust the inclusion and/or the size (and/or type) of the optional DF/container based on at least one of the following rules: first rule to eighth rule.

- First rule: When the number of times that message transmission is skipped (or the number of times of skipping the message transmission) is greater than or equal to [X] (or [X=1]), the UE may include and transmit the optional DF (e.g., path history) in a message. The value of X may be a value (pre)configured by the BS/network/server, a value defined in the ITS/SAE scenario, or a value preconfigured to the UE.
- Second rule: As the number of times that message transmission is skipped (or the number of times of skipping the message transmission) increases, the size/type of the optional DF (e.g., path history) included in a next (first) transmitted message may increase (or be the same). For example, as the number of times that message transmission is skipped increases, the size of path history data included in the next (first) transmitted message may also increase. In other words, the number of path points included in the path history may increase as the number of times that previous message transmission is skipped increases. The relationship between the number of times that message transmission is skipped and the number of path points included in the next (first) transmitted message may be a value (pre) configured by the BS/network/server or a value preconfigured to the UE (alternatively, the relationship between the number of path points included in the message and the number of times of skipping message transmission may be preconfigured by the BS/network/server or preconfigured to the UE).
- Third rule: The UE may include and transmit the optional DF (e.g., path history) included in a message (only) if a time interval T_gap (=t_1−t_0) between N-th message transmission and next message transmission is greater than or equal to [Y=T_GenVamMax]. However, the value of Y value may be a value (pre)configured by the BS/network/server, a value defined in the ITS scenario, or a value preconfigured to the UE.

Fourth rule: As a time interval T_gap (=t_1−t_0) between the N-th message transmission and the next message transmission increases, the size/type of the optional DF (e.g., path history) included in a next (first) transmitted resume message may increase (or be the same). For example, as the number of times that message transmission is skipped increases, the size of path history data included in the resume message may increase. In other words, the number of path points included in the path history may increase as the number of times that previous message transmission is skipped increases. The relationship between T_gap and the number of path points included in the next (first) transmitted message may be a value (pre)configured by the BS/network/server or a value preconfigured to the UE. Alternatively, the relationship between T_gap and the number of path points included in the message may be preconfigured by the BS/network/server or preconfigured to the UE).

Fifth rule: From the perspective of Reference Point Position Change, Ground Speed Change, Ground Velocity Orientation Change, and/or Trajectory Interception Probability Change, whether the optional DF (e.g., path history) is included in a message may be determined depending on whether there is a change more than or equal to a specific threshold (=Thr_A) from the N-th message transmission to the (N+1)-th message transmission (or at the time of the (N+1)-th message transmission compared to the N-th message transmission). Here, Reference Point Position Change, Ground Speed Change, Ground Velocity Orientation Change, and/or Trajectory Interception Probability Change may be parameters included in the message generation/transmission triggering conditions (or parameters related to trigger conditions) in the ITS/SAE scenario. Alternatively, whether the optional DF is included in a resume message (or (N+1)-th message) may be determined depending on whether there is a change more than or equal to the change threshold (Thr_A) in at least one of the parameters related to trigger conditions from the N-th message transmission to the (N+1)-th message transmission.

Additionally/alternatively, whether the optional DF (e.g., path history) is included in a message may be determined depending on whether there is an event in which the minimum safe lateral/longitudinal/vertical distance between the UE and one or more surrounding vehicles is less than or equal to a specific threshold (Thr_B) after/compared to the N-th message transmission. Alternatively, whether the optional DF is included in a resume message (or (N+1)-th message) may be determined depending on whether the minimum safe lateral/longitudinal/vertical distance between the UE and surrounding vehicles after the N-th message transmission is less than or equal to the distance threshold (=Thr_B).

Here, the change threshold (Thr_A) and/or the distance threshold (Thr_B) may be configured/defined as values distinct from the thresholds applied as the message generation/transmission triggering conditions in the ITS scenario (e.g., minReferencePointPositionChangeThreshold, minGroundSpeedChangeThreshold, minGroundVelocityOrientationChangeThreshold, minTrajectoryInterceptionProbChangeThreshold, MSLaD, MSLoD, MSVD). Additionally, the change threshold (which is a threshold for each of the parameters: Reference Point Position Change, Ground Speed Change, Ground Velocity Orientation Change, and Trajectory Interception Probability Change) may be smaller than the values of minReferencePointPositionChangeThreshold, minGroundSpeedChangeThreshold, minGroundVelocityOrientationChangeThreshold, minTrajectoryInterceptionProbChangeThreshold defined/configured for messages. Alternatively, the distance threshold (which is a threshold for each of the minimum safe lateral/longitudinal/vertical distances between the UE and one or more surrounding vehicles) may be greater than the values of MSLaD, MSLOD, and MSVD defined/configured for messages. For example, a change in Reference Point Position may not be sufficient to meet the message generation/transmission triggering conditions (i.e., the change is below minReferencePointPositionChangeThreshold). In this case, when the UE intends to skip transmission of some periodic messages, if the change in Reference Point Position exceeds the change threshold (Thr_A) related to the corresponding parameter, the UE may include path point information for representing the change in Reference Point Position in the path history when transmitting a resume message (or resumption message). On the other hand, if the change in Reference Point Position is less than minReferencePointPositionChangeThreshold and less than the change threshold (Thr_A) related to the corresponding parameter, the UE may not include the path history information when transmitting the resume message (or resumption message). The configuration/definition of the change threshold (Thr_A) and/or distance threshold (Thr_B) may minimize the occurrence of unnecessary message generation/transmission triggering events while also minimizing the loss of UE information due to skipped message generation/transmission.

Sixth rule: The optional DF (e.g., path history) is included and transmitted in a message (only) if the number of times that the role/state of the UE transitions (in particular, the number of times that the UE transitions to a state/role where the UE does not need to perform transmission (and/or reception) of a VRU message (defined/allowed in the ITS scenario)) during the time interval T_gap (T_gap=t_1−t_0) between the point in time at which the N-th message is transmitted and the point in time at which the (N+1)-th message, which is the next message, is transmitted is more than or equal to [Z=1]. In other words, when message transmission is skipped between the N-th message and the (N+1)-th message, the UE may transmit the optional DF containing information related to the skipped message in the N+1-th message only if the number of times that the role and/or state transitions is more than or equal to Z. The value of Z may be a value (pre)configured by the BS/network/server, a value defined in the ITS standards, or a value preconfigured to the UE.

Seventh rule: The optional DF (e.g., path history) is included and transmitted in a message (only) if the history of changes in the role/state of the UE includes instances where the UE transitions to a VRU role/state in which the UE does not need to perform transmission (and/or reception) of a VRU message during the time interval T_gap (T_gap=t_1−t_0) between the point in time at which the N-th message is transmitted and the point in time at which the (N+1)-th message, which is the next message, is transmitted Eighth rule: As the number of times that the role/state of the UE transitions (in particular, the number of times that the UE transitions to a state/role where the UE does not need to perform transmission (and/or reception) of a message (defined/allowed in the ITS scenario), that is, the number of times that the UE transitions to the first state) increases during the time interval T_gap (T_gap=t_1−t_0) between the N-th message transmission and the subsequent message transmission, the size/type of the optional DF (e.g., path history) included in a next (first) transmitted resume message may increase (or be the same). For example, as the number of times that the UE transitions to the VRU role/state in which the UE does not need to perform transmission (and/or reception) of a message increases, the size of path history data included in the resume message (i.e., the next (first) transmitted message) may increase. Alternatively, as the number of times that the role/state of the UE transitions during T_gap increases, the UE may increase the size of the optional DF included in the resume message. In addition, the relationship between the number of times that the role/state of the UE transitions and the number of path points included in the next (first) transmitted message may be a value (pre)configured by the BS/network/server or a value preconfigured to the UE.

The rules described above provide specific criteria for determining whether optional information such as a path history is included in a VRU message and the number of path points to be included depending on UE situations (for example, the occurrence of message generation/transmission triggering events, the location of the UE, etc.). Thus, the rules offers the advantage of resizing/reducing the size of messages efficiently.

Below, specific examples related to the above-described methods will be described in detail.

Figure 13:
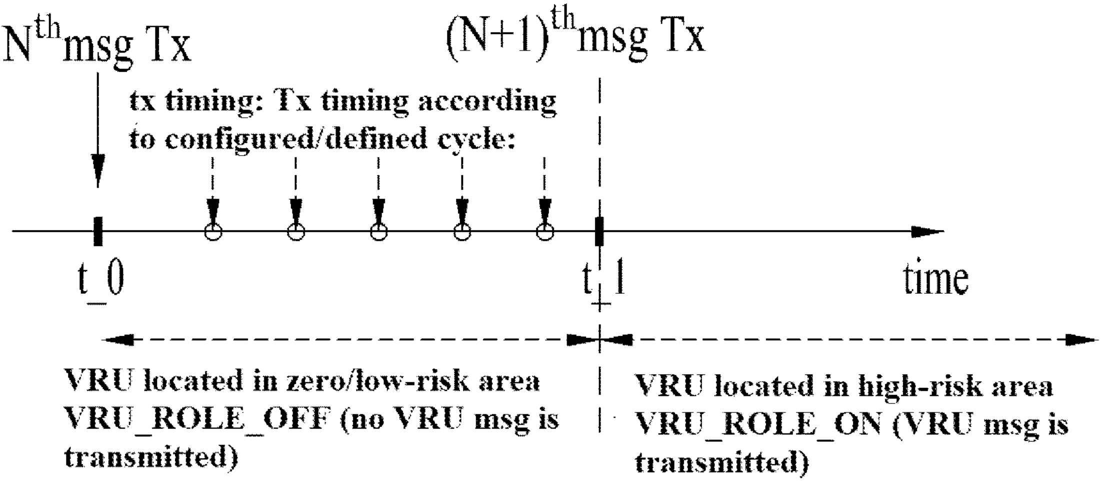

FIGS. 12 and 13 are diagrams for explaining methods by which a UE transmits a message or skip transmission thereof.

Referring to FIG. 12, the UE may operate according to the specific condition (CONDITION A) based on the first embodiment described above.

First, the conventional UE operations according to the ITS/SAE scenario are as follows.

The message is defined to be transmitted periodically according to the message generation rules defined in the ITS/SAE scenario. When the UE transmits the message, the length of the time interval between previous message transmission (e.g., N-th transmission at t_0 in FIG. 12) and next message transmission (e.g., (N+1)-th transmission at (t_0+T) in FIG. 12) is not allowed to be greater than a predefined value (=T_GenVamMax) (e.g., T in FIG. 12). For example, there may be situations where message generation triggering conditions are not met during a specific time interval (=T_gap) (e.g., T_gap=(t_1−t_0) in FIG. 12) after the N-th transmission. In this case, if T_gap is greater than T_GenVamMax, the UE needs to generate/transmit a message at a specific point in time (t_0+T_GenVamMax) (time t_0+T in FIG. 12). In addition, the UE needs to perform generation/transmission of an (N+2)-th message at a point in time (t_1 in FIG. 12) when the message generation triggering conditions are satisfied after the specific point in time. If the role/state of the UE is the first state (i.e., VRU_ROLE_OFF, VRU-IDLE, or VRU-PASSIVE), the UE may be allowed not to generate/transmit (and receive) messages, exceptionally.

In contrast, UE operations according to Proposal 1 may be performed as follows.

When the message generation triggering conditions are not satisfied during the time interval of T_gap (T_gap=(t_1−t_0) in FIG. 12) after the N-th message transmission, even if T_gap is greater than T_GenVamMax, which is a predefined/preconfigured message transmission cycle, the UE may skip message generation/transmission at a specific point in time (t_0+T_GenVamMax) (t_0+T in FIG. 12) (although the role/state of the UE is the second state (i.e., VRU_ROLE_ON, or VRU-ACTIVE_STANDALONE, or VRU-ACTIVE-CLUSTER-LEADER)). In this case, the UE may generate and transmit the (N+1)-th message at a point in time t_1 (t_0+T_gap) where a message generation/transmission triggering event actually occurs.

Additionally, when transmitting the (N+1)-th VRU message, the UE may transmit information on T_gap to the server (or the UE may transmit a VRU message containing the information on T_gap together). Based on the length of the T_gap interval (or the number of times that message transmission is skipped within the T_gap interval), the UE may determine whether to include a path history DF in the (N+1)-th message and/or the amount of path history data included in the message (i.e., the number of path points used to represent the path history). In this case, the amount of path history data and/or the inclusion of the path history DF may be determined based on at least one of the aforementioned first to eighth rules (rules for adjusting/configuring the amount/type of data). For example, a VRU may determine whether to include path history information in a next transmitted VRU message or determine the number of path points included in the path history information based on factors such as the length of a skipping duration in which message transmission is skipped and the number of times that message transmission is skipped within the skipping duration.

Referring to FIG. 13, the UE may operate according to the specific condition (CONDITION A) based on the second embodiment described above.

According to the specific condition (CONDITION A) based on the second embodiment described above, the UE switches the VRU role/state of the UE from the first state (i.e., VRU_ROLE_OFF, VRU-IDLE, or VRU-PASSIVE) to the second state (i.e., VRU_ROLE_ON, VRU-ACTIVE-_STANDALONE, or VRU-ACTIVE-CLUSTER-LEADER). In this case, the UE may include information on T_gap (t_1−t_0) in a message that is transmitted (first) after the transition of the role/state of the UE and then transmit the message to the server (or the UE may transmit a VRU message containing the information on T_gap together). The amount of path history data (i.e., the number of path points used to represent the path history) and/or the inclusion of a path history DF in the message transmitted (first) after the transition of the role/state of the UE may be determined based on the length of the T_gap interval (or the number of times that message transmission is skipped within the T_gap interval). In addition, the amount of path history data and/or the inclusion of the path history DF may be determined based on at least one of the aforementioned first to eighth rules (rules for adjusting/configuring the amount/type of data).

In Proposal 1, it is described that when the "specific conditions (=CONDITION A)" are satisfied, message transmission is skipped even if a point in time for message generation/transmission determined according to a message transmission cycle (which is defined in the ITS/SAE scenario or preconfigured) is reached. However, when CONDITION A is satisfied, the UE may transmit to the server only some or all of the DFs that have changed compared to previously transmitted messages (and/or mandatory DFs/containers) at the point in time for message generation/transmission determined according to the message transmission cycle (or at the skipping point in time). The UE may transmit differential values for some or all of the DFs that have changed compared to the previously transmitted messages (and/or mandatory DFs/containers). In other words, instead of completely skipping message transmission, the UE may transmit to the server a separate message containing information (i.e., first change information) about the DFs with changes compared to the previously transmitted messages before the skipping point in time (i.e., messages transmitted before the skipping) or information (i.e., second change information) about the differential values for the DFs in terms of the degree of change at the point in time for message generation/transmission determined according to the message transmission cycle. Furthermore, the separate message may include information on the role/state of the UE at the point in time for message generation/transmission and be transmitted to the server.

Even with these assumptions on the UE operations, the operations described in Proposal 1 may be similarly applied. Specifically, ① when the point in time for message generation/transmission determined according to the message transmission cycle is reached, the UE may transmit the separate message that includes the first change information or the second change information even if message generation/transmission triggering events (e.g., Trigger Conditions 2) and 7) defined in Table 6) do not occur. Alternatively, ② when the UE performs generation/transmission of a message due to the occurrence of message generation/transmission triggering events (e.g., Trigger Conditions 2) and 7) defined in Table 6), the UE may (further) include information related to ① in the form of INFO_A in the message and then transmit the message to the application server. In this case, INFO_A may be defined as follows:

- The length of the interval (i.e., T_gap) between the point in time (t_0 in FIG. 12) of the previous last message transmission performed by event "②" and the point in time (t_1 in FIG. 12) of the current message transmission performed by event "②."
- t_0 and t_1
- Information on the point in time when only some data or differential values for some/all data are transmitted to the server (that is, information on the actual time when event "①" occurs within the interval between t_0 and t_1).
- The number of times that only some data or differential values for some/all data are transmitted to the server within the interval between t_0 and t_1 (that is, the number of occurrences of event "①" within the interval between t_0 and t_1).
- The message transmission cycle (for example, T_GenVamMax or T in FIG. 12)
- Information on the role/state of the UE at the point in time when event "①" occurs.

Furthermore, when a message is transmitted (first) after the occurrence of event "①", the amount (and/or type) of data in the optional DF included in the message is determined by the number of occurrences of event "①" (within the time interval between the point in time of the previous message transmission performed by event "②" and the point in time of the current message transmission performed by event "②") and/or the length of the time interval (i.e., T_gap).

The server (and/or RSU) may directly generate a message (e.g., UE message) containing UE information according to the cycle configured for the UE in response to skipping of message transmission by the UE. The details of the message generation will be explained further in Proposal 2 below.

2. Proposal 2

Figure 14:
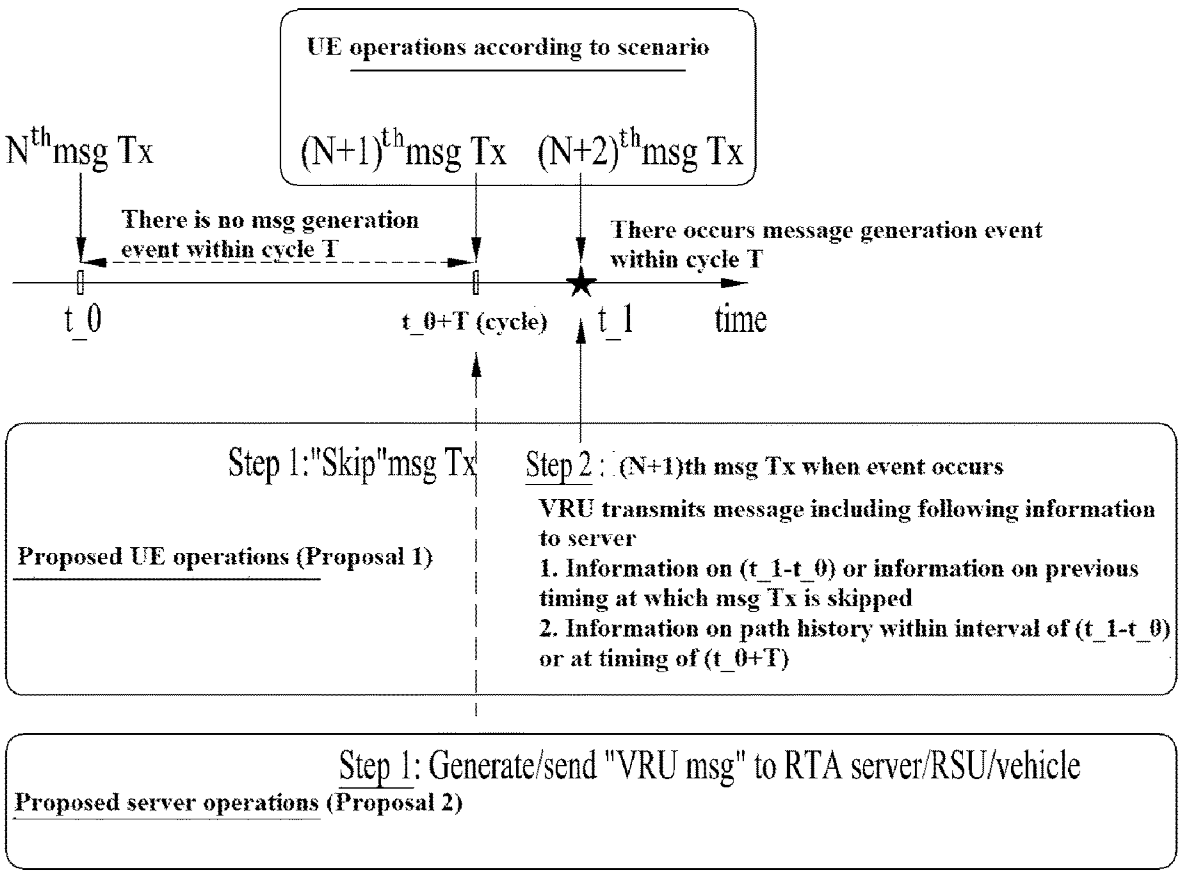
FIG. 14 is a diagram for explaining operations of transmitting and receiving messages between a server and a UE.

FIG. 14 is a diagram for explaining operations of transmitting and receiving messages between a server and a UE.

Referring to FIG. 14, the server may directly generate and transmit a UE message containing UE information in relation to the message transmission and message transmission skipping operations of the UE.

Even if the UE aperiodically transmits a message (where periodic transmission is defined) according to the VRU operations described in Proposal 1, UE information may be linked to the legacy ITS system based on short-range communication. In this scenario, the server (and/or RSU) may directly generate a message containing the UE information according to the cycle configured for the UE and transmit the message to vehicles through short-range communication. Upon receiving the corresponding UE information in the message transmitted by the server (and/or RSU) through short-range communication according to the existing ITS/SAE scenario, the vehicles may perceive that the UE is performing periodic message transmission.

Proposal 2 described above may be applied to the system structure shown in FIG. 11(*c*).

The "server" that directly generates the message containing the UE information according to the message generation cycle for the UE as described above (that is, the server that makes the vehicles that receive the UE-related message through short-range communication according to the ITS/SAE scenario experience as if the periodic message transmission is performed) may be an (privatized) application server or an (ITS) server managed by a country/region/local government/road administrator.

The message directly generated by the server or RSU may be a message using any message format defined in the ITS/SAE scenario. The message may be identical to a message transmitted by the UE to the server at a point in time before the UE skips periodic message transmission. The message may also be a message in which some or all DFs are modified/deleted/added (by the server and/or RSU) based on the message transmitted by the UE to the server at the point in time before the UE skips the periodic message transmission. In the latter case, based on the results learned/perceived/predicted by the server and/or RSU regarding the movement/state/surrounding environment of the UE, the server and/or RSU may modify/delete/add some or all DFs in the message that the server and/or RSU receives from the UE at the previous point in time. Furthermore, when the server and/or RSU intends to modify/delete/add VRU information, if the server and/or RSU modifies or adds UE information, the server and/or RSU may include information contained in the previous UE-related message and differential value(s) therefor in the message. Alternatively, the server and/or RSU may include only the differential values compared to the previous UE-related message in the message (by assuming that a UE (vehicle) that receives the UE-related message has already received the previously transmitted message).

When the operations of Proposal 2 described above are applied to the server or RSU and when operations between the UE and server performing communication based on the Uu interface are linked with the legacy ITS system based on short-range communication, even if the UE performs transmission of an event-triggered message as described above in Proposal 1 (or skips transmission of part of a message where periodic transmission is defined), a vehicle that ultimately receives the corresponding message through short-range communication may receive the message in the same way as the "message where periodic transmission is defined in the ITS/SAE scenario." In other words, only when the server/RSU operations described in Proposal 2 are performed, a UE (e.g., VRU, vehicle, RSU, etc.) supposed to obtain UE information through the existing legacy ITS system may acquire UE-related messages/information without distinguishing whether the UE information is generated/transmitted through the legacy ITS system based on short-range communication (or according to the ITS/SAE scenario).

Alternatively, to assist the UE operating according to Proposal 1, the server may directly generate a message containing UE information according to the cycle configured for the UE and transmit the message to surrounding vehicles through short-range communication. Specifically, when the server receives a message regarding the UE through the Uu interface, the server may deliver a message for short-range communication, which contains information in the message, to the surrounding vehicles of the UE. In this case, even if the UE does not transmit the message periodically according to Proposal 1, the server may directly generate the message containing the UE information and periodically transmit the directly generated message to the surrounding vehicles through short-range communication. The message directly generated by the server may be transmitted based on specific message formats or arbitrary message formats defined in the ITS/SAE scenario. The server may transmit a message with the same content as a message transmitted at a previous point in time, where the UE skips message transmission, at a point in time corresponding to the skipping point in time. The server may also transmit a message obtained by deleting, modifying, or adding some content of the message transmitted at the previous point in time at the point in time corresponding to the skipping point in time. In the latter case, considering the movement, state, or surrounding environment of the UE, the server may modify the content of some DFs included in the message transmitted at the previous point in time. For example, the server may use an artificial neural network trained to predict the location and movement of the UE at the point in time corresponding to the skipping point in time based on information contained in the message transmitted at the previous point in time in order to generate and transmit a message containing UE information predicted at the skipping point in time.

For example, even if a VRU performs transmission of an event-triggered message, vehicles that ultimately receive the message through short-range communication may receive the message in the same way as the message where periodic transmission is defined in the ITS/SAE scenario. In other words, the ITS/SAE scenario may be satisfied in terms of the transmission cycle with the assistance of the server according to Proposal 2.

Figure 15:
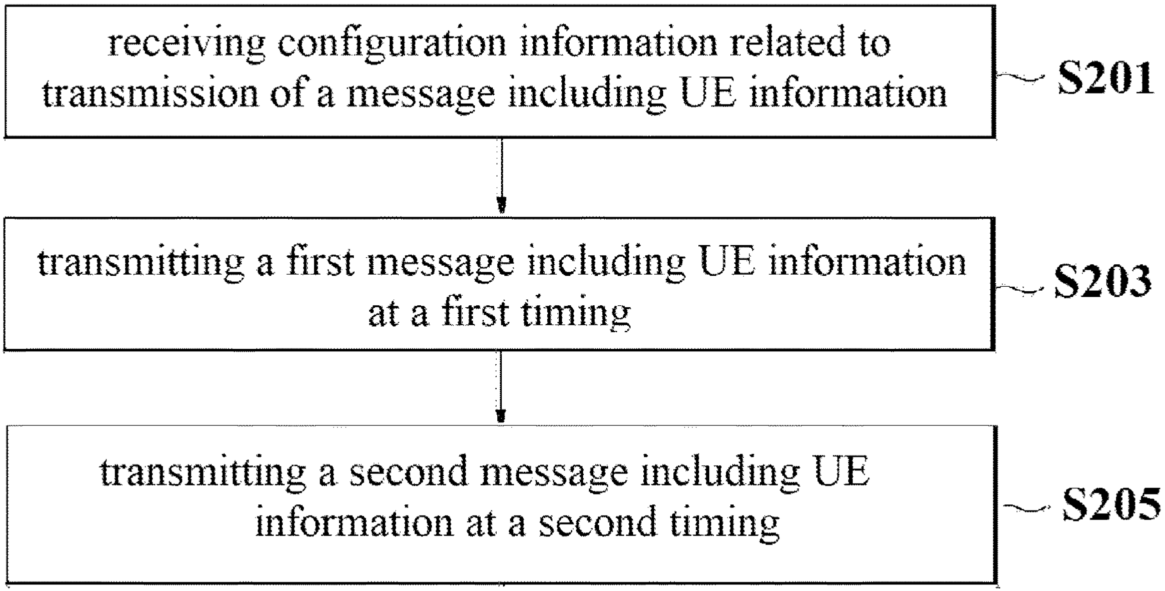
FIG. 15 is a diagram for explaining a method by which a UE transmits a message containing UE information.

FIG. 15 is a diagram for explaining a method by which a UE transmits a message containing UE information.

Referring to FIG. 15, the UE may receive configuration information related to transmission of the message (or UE message) containing the UE information from a server (or ITS server) (S201). The configuration information may include configuration information on the transmission cycle of the message, the trigger conditions of the message described above with reference to FIG. 10, the specific conditions related to message skipping (CONDITION A) described above with reference to FIG. 11, the skipping information (=INFO_A), and the first to eighth rules defined to adjust the amount/type of data included in optional DFs/containers. The UE may be a VRU device, V2X device, etc.

For example, the configuration information may include information for configuring the transmission cycle and/or triggering conditions of the message for each UE/service. Specifically, depending on the type of service that the UE receives, the UE may configure or determine the triggering conditions and transmission cycle thereof based on the configuration information. In this case, UEs receiving the same service may have the same triggering conditions and transmission cycles.

The configuration information containing the triggering conditions or transmission cycle may be received (from the BS/server) at intervals longer than the transmission cycle of a UE message. Alternatively, if there is no need for changes in the triggering conditions and transmission cycle, the UE may receive the configuration information only when initially accessing the server/BS. Thereafter, the UE may perform operations related to message transmission based on the triggering conditions and transmission cycle included in the configuration information which the UE obtains during the initial access.

Then, the UE may transmit a first message containing the UE information at a first point in time based on the trigger conditions included in the configuration information (S203). For example, if at least one of the trigger conditions is satisfied, the UE may transmit the first message at the first point in time.

The UE may transmit a second message containing the UE information at a second point in time based on the trigger conditions (S205). For example, if at least one of the trigger conditions is satisfied, the UE may transmit the second message at the second point in time. The second message may be a message transmitted first after the transmission of the first message.

In one example, the UE may transmit the first message when preconfigured trigger conditions included in the configuration information are satisfied. Subsequently, after transmitting the first message, the UE may transmit the second message if the trigger conditions are satisfied. Here, the preconfigured trigger conditions may include at least one of conditions/events ① to ⑥ in FIG. 10. For instance, the preconfigured trigger conditions may include at least one of the following: when there is a change in the mobility of the UE exceeding a specific threshold; when the distance between the UE and nearby devices is less than a specific threshold distance; and when the UE joins a cluster.

If there is no situation or event satisfying the trigger conditions until a third point in time, which is a point in time after a first threshold interval from the first point in time, the UE may skip transmission of a third message at the third point in time. According to the prior art, even if there is no event satisfying the trigger conditions, the third message is transmitted at the third point in time once the first threshold interval elapses. On the other hand, the proposed method does not require the above transmission. However, based on skipping of the third message, the inclusion and size of an optional data DF/container in the second message may be determined.

In one example, based on whether at least one third message is skipped in a first time interval between the first point in time and the second point in time, the UE may determine whether to additionally include the optional DF/container in the second message. The at least one third message may be skipped at the third point in time only if the first time interval between the first point in time and the second point in time is greater than or equal to the first threshold interval. Furthermore, the first threshold interval may be predetermined based on the transmission cycle included in the configuration information. For instance, the first threshold interval may be predetermined to be the same value as T_GenVamMax described in FIG. 11.

Based on the first to eighth rules defined above, the UE may determine whether to additionally include a DF (optional DF/container) containing a path history in the second message and determine the size (in bits) and/or type of the DF. For example, when the number of times that transmission is skipped within the first time interval between the first point in time and the second point in time is greater than or equal to a threshold count or when the first time interval is greater than or equal to a second time interval, the UE may additionally include the DF containing the path history in the second message. In other words, when the number of times that the at least one third message is skipped within the first time interval is greater than or equal to the threshold, the UE may additionally include the DF containing the path history in the second message. Alternatively, when the first time interval is greater than or equal to the second time interval, the UE may additionally include the DF in the second message. The UE may determine the size or type of the DF based on the number of times that transmission is skipped or the length of the first time interval. In this case, the number of path points related to the path history may vary depending on the size of the DF. For example, as the size of the DF increases, more path points may be included in the DF.

If the number of times that the UE transitions from a second state to a first state within the first time interval between the first point in time and the second point in time is greater than or equal to a threshold transition count, the UE may additionally include the DF in the second message. In addition, the UE may adjust the size/type of the DF based on the number of transitions. Herein, the first state may refer to a state in which the role/state of the UE necessitates no message transmission as described above (e.g., VRU_ROLE_OFF, VRU-IDLE, or VRU-PASSIVE), and the second state may refer to a state in which the UE is required to transmit the message containing the UE information (see Table 7 and Table 8).

In one example, when the UE skips transmitting the third message, the UE may transmit skipping information related thereto. As described above, the skipping information may be transmitted at the second point in time or at the third point in time. As described above in FIGS. 11 to 14, the skipping information may include information on the third point in time at which the third message is skipped, the number of times that the third message is skipped, and so on. For example, the skipping information may include at least one of: the third point in time, the first point in time, the second point in time, the number of times that transmission is skipped within the first time interval, or the number of times that the UE transitions from the first state to the second state within the first time interval. Herein, the first state may refer to a state in which the role/state of the UE necessitates no message transmission as described above (e.g., VRU_ROLE_OFF, VRU-IDLE, or VRU-PASSIVE), and the second state may refer to a state in which the UE is required to transmit the message containing the UE information (see Table 7 and Table 8).

In summary, some transmissions may be skipped in event-based periodic message transmission, thereby not only significantly reducing the amount and frequency of data in communication between a VRU and a SoftV2X server but also reducing the operational costs of the SoftV2X server and minimizing power consumption for the VRU.

Figure 16:
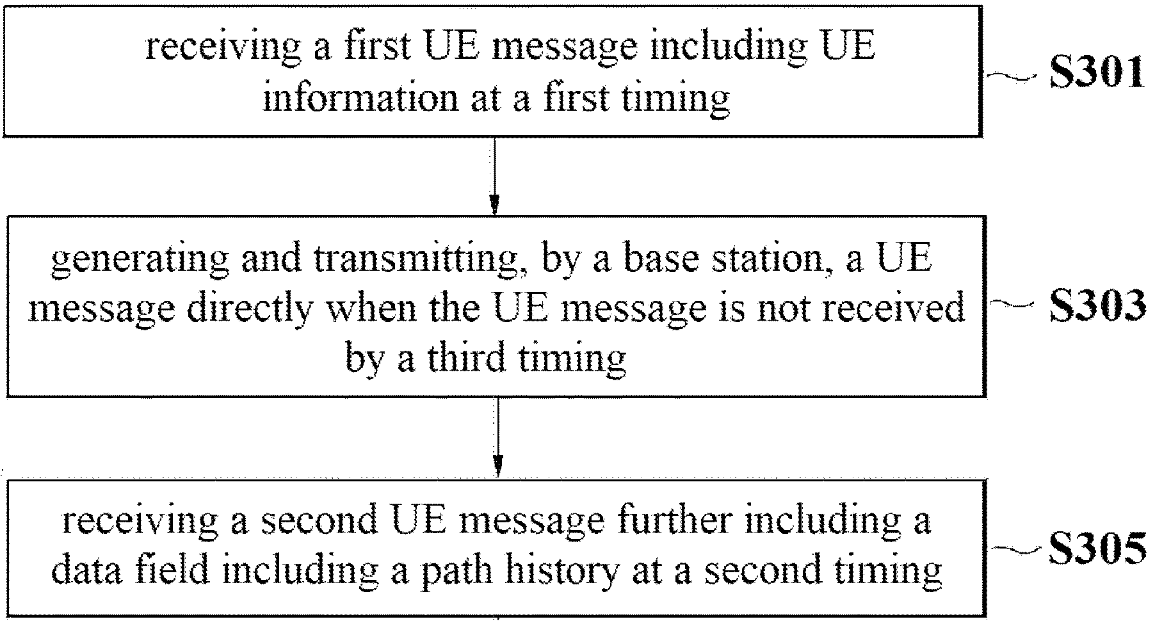
FIG. 16 is a flowchart for explaining a method by which a server receives a UE message containing UE information.

FIG. 16 is a flowchart for explaining a method by which a server receives a UE message containing UE information.

Referring to FIG. 16, the server may receive the UE message containing the UE information from a UE (S301). For example, the server may receive a first UE message containing UE information at a first point in time. The server may forward the UE message to surrounding UEs and/or surrounding vehicles of the UE. In this case, the UE message may require periodic transmission. For example, the UE message may be transmitted to the surrounding UEs and/or surrounding vehicles. The UE message may be required and/or expected to be transmitted at least once within a first threshold interval (e.g., T_GenVamMax).

Next, if the server fails to receive the UE message until a third point in time, which is after the first threshold interval from the first point in time, the server may directly generate the UE message and transmit the UE message to surrounding devices (S303). This is because the surrounding UEs and/or surrounding vehicles expect the UE message regarding the UE to be received within at least the first threshold interval. Here, the first threshold interval may be a time interval corresponding to T_GenVamMax as described above.

As described with reference to FIGS. 11 to 15, according to Proposal 1, when preconfigured trigger conditions are not satisfied, the UE may not transmit the UE message even if the first threshold interval has passed from the first point in time. In other words, the UE may skip the transmission of the UE message at the third point in time, which is after the first threshold interval from the first point in time. In this case, the server may directly generate the UE message for the surrounding UEs and/or surrounding vehicles based on the first UE message and transmit the directly generated UE message to the surrounding UE and/or surrounding vehicles.

Thereafter, the server may receive a second UE message, which includes a DF containing a path history, at a second point in time after the third point in time (305). The path history may contain information on path points, which include positions and time information related to the positions (i.e., path delta time information). In this case, the size and type of the DF may be determined based on the number of times that transmission is skipped within the first time interval between the first point in time and the second point in time, a threshold count, the length of the first time interval, and the number of times that the UE transitions from a second state to a first state as described above.

The server may receive skipping information along with the second UE message at the second point in time. As described above with reference to FIGS. 11 to 15, the skipping information may include at least one of: the third point in time, the first point in time, the second point in time, the number of times that transmission is skipped within the first time interval, or the number of times that the UE transitions from the first state to the second state within the first time interval. The server may receive the skipping information from the UE at the third point in time.

As described above, the server may use a deep learning model to predict information on the position and velocity of the UE at the third point in time based on the first UE message. The server may directly generate the UE message containing the predicted information on the UE and transmit the UE message to the surrounding UEs and/or surrounding vehicles.

In summary, even when the UE is allowed to skip the transmission of the UE message, the server may directly generate the UE message for the surrounding UEs and/or surrounding vehicles (e.g., UEs/vehicles operating based on the existing ITS/SAE scenario) that expect the periodic transmission of the UE message and transmit the UE message to the surrounding UEs and/or surrounding vehicles. That is, when the server may directly generate/transmit the skipped UE message, thereby ensuring the periodicity of the UE message in the existing ITS/SAE scenario for the UEs/vehicles operating based on the existing ITS/SAE scenario, without additional changes in the ITS/SAE scenario, Communication System Example to Which the Present Disclosure is Applied Although not limited thereto, various descriptions, functions, procedures, proposals, methods, and/or operational flow charts of the present disclosure disclosed in this document may be applied to various fields requiring wireless communication/connection (5G) between devices.

Hereinafter, it will be illustrated in more detail with reference to the drawings. In the following drawings/description, the same reference numerals may exemplify the same or corresponding hardware blocks, software blocks, or functional blocks, unless otherwise indicated.

Figure 17:
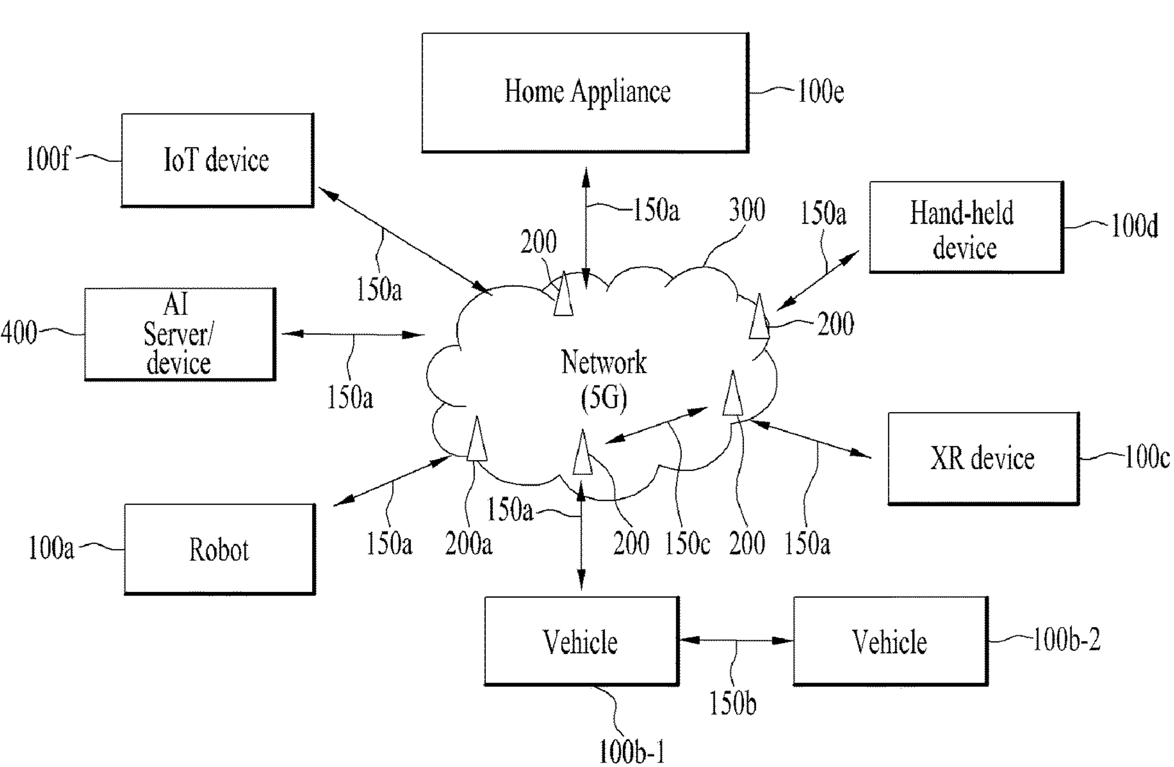
FIG. 17 illustrates a communication system applied to the present disclosure.

FIG. 17 illustrates a communication system applied to the present disclosure.

Referring to FIG. 17, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an extended Reality (XR) device 100*c*, a hand-held device 100*d*, a home appliance 100*e*, an Internet of Things (IOT) device 100*f*, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without passing through the BSs/network. For example, the vehicles 100*b*-1 and 100*b*-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b*, or 150*c* may be established between the wireless devices 100*a* to 100*f*/BS 200, or BS 200/BS 200. Herein, the wireless communication/connections may be established through various RATs (e.g., 5G NR) such as uplink/downlink communication 150*a*, sidelink communication 150*b* (or, D2D communication), or inter BS communication (e.g. relay, Integrated Access Backhaul (IAB)). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Examples of wireless devices to which the present disclosure is applied

Figure 18:
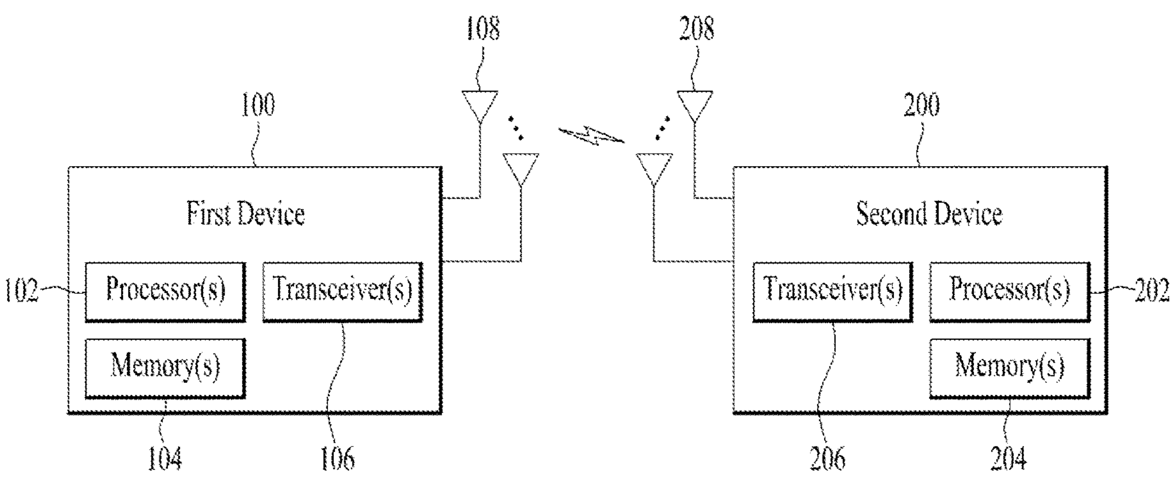
FIG. 18 illustrates wireless devices applicable to the present disclosure.

FIG. 18 illustrates a wireless device applicable to the present disclosure.

Referring to FIG. 18, a first wireless device 100 and a second wireless device 200 may transmit radio signals through a variety of RATs (e.g., LTE and NR). Herein, { the first wireless device 100 and the second wireless device 200} may correspond to { the wireless device 100*x* and the BS 200} and/or {the wireless device 100*x* and the wireless device 100*x*} of FIG. 17.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information acquired by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The first wireless device 100 may correspond to the above-described UE. The UE may include the processor(s) 102 connected to the RF transceiver(s) 106 and the memory(s). The memory(s) 104 may include at least one program for performing operations related to the embodiments described in FIGS. 11 to 17.

Specifically, the processor(s) 102 may control the RF transceiver(s) 106 to: receive configuration information related to transmission of a message; transmit a first message including UE information at a first point in time based on the configuration information; and transmit a second message including the UE information at a second point in time based on the configuration information. The second message may additionally include a data field including a path history based on that transmission of a third message is skipped at a third point in time between the first point in time and the second point in time. The processor(s) 102 may perform the operations described in FIGS. 11 to 17 based on the program included in the memory(s) 104.

Alternatively, a chipset including the processor(s) 102 and the memory(s) 104 may be configured. The chipset may include: at least one processor; and at least one memory operably connected to the at least one processor and configured to, when executed, cause the at least one processor to perform operations. The operations may include: receiving configuration information related to transmission of a message; transmitting a first message including UE information at a first point in time based on the configuration information; and transmitting a second message including the UE information at a second point in time based on the configuration information. The second message may additionally include a data field including a path history based on that transmission of a third message is skipped at a third point in time between the first point in time and the second point in time. The operations may include the operations described in FIGS. 11 to 17 based on the program included in the memory(s) 104.

Alternatively, a computer-readable storage medium having at least one computer program configured to cause the processor(s) 102 to perform operations may be provided. The operations may include: receiving configuration information related to transmission of a message; transmitting a first message including UE information at a first point in time based on the configuration information; and transmitting a second message including the UE information at a second point in time based on the configuration information. The second message may additionally include a data field including a path history based on that transmission of a third message is skipped at a third point in time between the first point in time and the second point in time. The operations may include the operations described in FIGS. 11 to 17 based on the program included in the memory(s) 104.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information acquired by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

The second wireless device 200 may correspond to the above-described server. The server may include the RF transceiver(s) 206, the processor(s) 202, and the memory(s) 204. The memory(s) 204 may include at least one program for performing operations related to the embodiments described in FIGS. 11 to 17.

Specifically, the processor(s) 202 may control the RF transceiver(s) 206 to receive a first UE message including UE information at a first point in time; generate a UE message directly and control the RF transceiver(s) 206 to transmit the UE message to surrounding devices based on that the UE message is not received until a third point in time, wherein the third point in time is after a first threshold interval from the first point in time; and control the RF transceiver(s) 206 to receive a second UE message at a second point in time, wherein the second UE message additionally includes a data field including a path history. The processor(s) 202 may perform the operations described in FIGS. 11 to 17 based on the program included in the memory(s) 204.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Examples of wireless devices to which the present disclosure is applied

Figure 19:
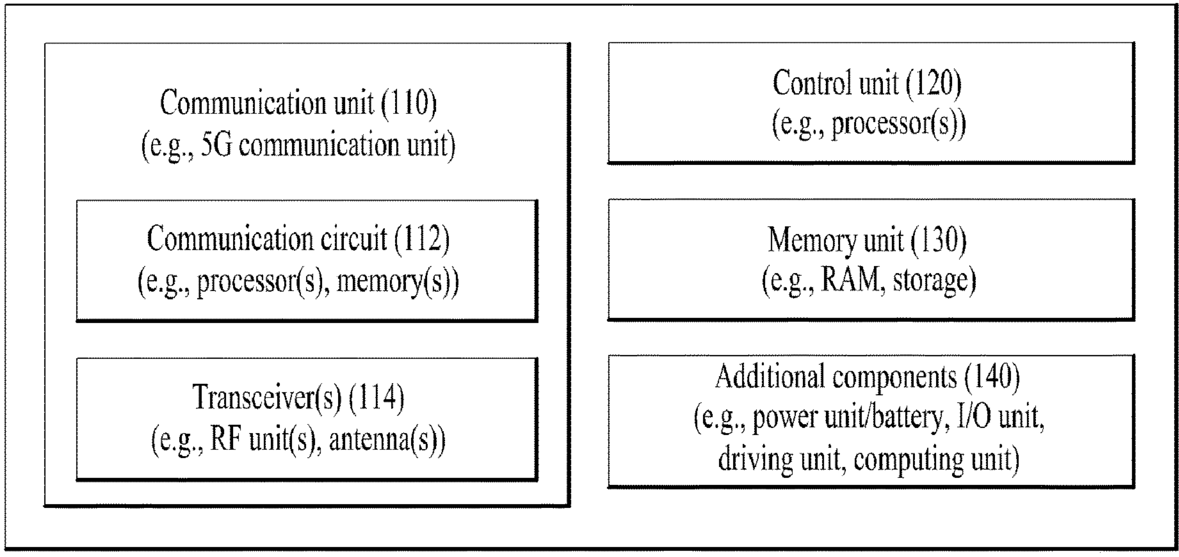
FIG. 19 illustrates another example of a wireless device to which the present disclosure is applied.

FIG. 19 illustrates another example of a wireless device applied to the present disclosure. The wireless device may be implemented in various forms according to a use-case/service (refer to FIG. 20).

Referring to FIG. 19, wireless devices 100 and 200 may correspond to the wireless devices 100 and 200 of FIG. 18 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 18. For example, the transceiver(s) 114 may include the one or more transceivers 106 and 206 and/or the one or more antennas 108 and 208 of FIG. 18. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 17), the vehicles (100*b*-1 and 100*b*-2 of FIG. 17), the XR device (100*c* of FIG. 17), the hand-held device (100*d* of FIG. 17), the home appliance (100*e* of FIG. 17), the IoT device (100*f* of FIG. 17), a digital broadcast terminal, a hologram device, a public safety device, an MTC device, a medicine device, a fintech device (or a finance device), a security device, a climate/environment device, the AI server/device (400 of FIG. 17), the BSs (200 of FIG. 17), a network node, etc. The wireless device may be used in a mobile or fixed place according to a use-example/service.

In FIG. 19, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 20:
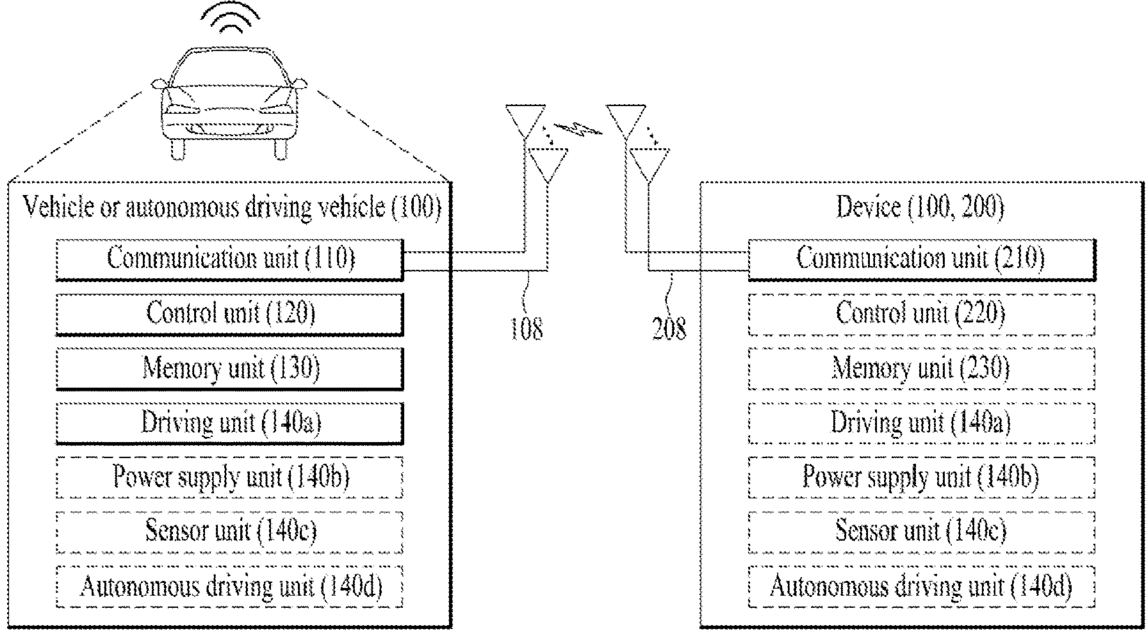
FIG. 20 illustrates a vehicle or an autonomous driving vehicle applied to the present disclosure.

Examples of Vehicles or Autonomous Vehicles to which the Present Disclosure is Applied FIG. 20 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 20, a vehicle or autonomous driving vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 19, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). Also, the driving unit 140*a* may cause the vehicle or the autonomous driving vehicle 100 to drive on a road. The driving unit 140*a* may include an engine, a motor, a powertrain, a wheel, a brake, a steering device, etc. The power supply unit 140*b* may supply power to the vehicle or the autonomous driving vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the acquired data. The control unit 120 may control the driving unit 140*a* such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly acquired data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Here, wireless communication technologies implemented in the wireless devices (XXX, YYY) of the present specification may include LTE, NR, and 6G, as well as Narrowband Internet of Things for low power communication. At this time, for example, the NB-IOT technology may be an example of a Low Power Wide Area Network (LPWAN) technology, and may be implemented in standards such as LTE Cat NB1 and/or LTE Cat NB2, and is not limited to the above-described names. Additionally or alternatively, the wireless communication technology implemented in the wireless devices (XXX, YYY) of the present specification may perform communication based on LTE-M technology. In this case, as an example, the LTE-M technology may be an example of LPWAN technology, and may be referred to by various names such as eMTC (enhanced machine type communication). For example, LTE-M technology may be implemented in at least one of a variety of standards, such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, and is not limited to the above-described names. Additionally or alternatively, the wireless communication technology implemented in the wireless devices (XXX, YYY) of the present specification is at least one of ZigBee, Bluetooth, and Low Power Wide Area Network (LPWAN) considering low power communication, and is not limited to the above-described names. As an example, ZigBee technology can generate personal area networks (PANs) related to small/low-power digital communication based on various standards such as IEEE 802.15.4, and may be called various names.

The embodiments described above are those in which components and features of the present disclosure are combined in a predetermined form. Each component or feature should be considered optional unless explicitly stated otherwise. Each component or feature may be implemented in a form that is not combined with other components or features. In addition, it is also possible to constitute an embodiment of the present disclosure by combining some components and/or features. The order of operations described in the embodiments of the present disclosure may be changed. Some configurations or features of one embodiment may be included in other embodiments, or may be replaced with corresponding configurations or features of other embodiments. It is obvious that the embodiments may be configured by combining claims that do not have an explicit citation relationship in the claims or may be included as new claims by amendment after filing.

In this document, embodiments of the present disclosure have been mainly described based on a signal transmission/reception relationship between a terminal and a base station. Such a transmission/reception relationship is extended in the same/similar manner to signal transmission/reception between a terminal and a relay or a base station and a relay. A specific operation described as being performed by a base station in this document may be performed by its upper node in some cases. That is, it is obvious that various operations performed for communication with a terminal in a network comprising a plurality of network nodes including a base station may be performed by the base station or network nodes other than the base station. The base station may be replaced by terms such as a fixed station, a Node B, an eNode B (eNB), an access point, and the like. In addition, the terminal may be replaced with terms such as User Equipment (UE), Mobile Station (MS), Mobile Subscriber Station (MSS).

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means.

As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure.

INDUSTRIAL APPLICABILITY

The above-described embodiments of the present disclosure are applicable to various mobile communication systems.

The invention claimed is:

1. A method performed by a vulnerable road user (VRU) device comprising:

receiving configuration information related to transmission of a message, wherein the configuration information includes information on a first threshold condition that triggers transmission of the message, and a second threshold condition for determining whether to add a data field for a path history to the message;

transmitting the message including VRU information at a first time point based on the configuration information; and transmitting the message including the VRU information at a second time point based on the configuration information, wherein each of the first threshold condition and the second threshold condition includes a threshold value related to a mobility change of the VRU device, and wherein, based on only the second threshold condition among the first threshold condition and the second threshold condition being satisfied at a third time point between the first time point and the second time point, the message transmitted at the second time point further includes the data field for the path history related to the third time point.

2. The method of claim 1, wherein the first threshold condition includes at least one of:

a change in speed of the VRU device exceeding a first speed threshold; or a change in direction of movement of the VRU device greater than or equal to a first direction threshold.

3. The method of claim 2, wherein the second threshold condition includes at least one of:

the change in the mobility of the VRU device that is greater than or equal to a second speed threshold and less than or equal to the first speed threshold, or the change in the direction of movement of the VRU device that is greater than or equal to a second direction threshold and less than or equal to the first direction threshold.

4. A vulnerable road user (VRU) device comprising:

a radio frequency (RF) transceiver; and a processor connected to the RF transceiver, wherein the processor is configured to control the RF transceiver to:

receive configuration information related to transmission of a message, wherein the configuration information includes information on a first threshold condition that triggers transmission of the message, and a second threshold condition for determining whether to add a data field for a path history to the message;

transmit the message including VRU information at a first point in time based on the configuration information; and transmit the message including the VRU information at a second point in time based on the configuration information, wherein each of the first threshold condition and the second threshold condition includes a threshold value related to a mobility change of the VRU device, and wherein, based on only the second threshold condition among the first threshold condition and the second threshold condition being satisfied at a third time point between the first time point and the second time point, the message transmitted at the second time point further includes the data field for the path history related to the third time point.

* * * * *